United States Patent
Sivaraman et al.

(10) Patent No.: US 10,860,766 B1
(45) Date of Patent: Dec. 8, 2020

(54) COMPILATION FLOW FOR A HETEROGENEOUS MULTI-CORE ARCHITECTURE

(71) Applicant: Xilinx, Inc., San Jose, CA (US)

(72) Inventors: Mukund Sivaraman, Palo Alto, CA (US); Shail Aditya Gupta, San Jose, CA (US); Akella Sastry, San Jose, CA (US); Rishi Surendran, San Jose, CA (US); Philip B. James-Roxby, Longmont, CO (US); Samuel R. Bayliss, Mountain View, CA (US); Vinod K. Kathail, Palo Alto, CA (US); Ajit K. Agarwal, Hyderabad (IN); Ralph D. Wittig, Menlo Park, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/420,881

(22) Filed: May 23, 2019

(51) Int. Cl.
| | |
|---|---|
| *G06F 30/347* | (2020.01) |
| *G06F 8/41* | (2018.01) |
| *G06F 16/901* | (2019.01) |
| *G06F 30/394* | (2020.01) |
| *G06F 12/1081* | (2016.01) |
| *G06F 115/02* | (2020.01) |

(52) U.S. Cl.
CPC ............ *G06F 30/347* (2020.01); *G06F 8/443* (2013.01); *G06F 12/1081* (2013.01); *G06F 16/9024* (2019.01); *G06F 30/394* (2020.01); *G06F 2115/02* (2020.01); *G06F 2212/621* (2013.01)

(58) Field of Classification Search
CPC .. G06F 30/347; G06F 16/9024; G06F 30/394; G06F 8/443; G06F 12/1081

USPC ........................................................ 716/117
See application file for complete search history.

(56) References Cited

U.S. PATENT DOCUMENTS

| | | | |
|---|---|---|---|
| 5,848,264 A | 12/1998 | Baird et al. | |
| 6,090,156 A | 7/2000 | MacLeod | |
| 7,080,283 B1 | 7/2006 | Songer et al. | |
| 8,719,808 B1 | 5/2014 | Prinzing | |
| 9,578,099 B2 | 2/2017 | Llorca et al. | |
| 10,628,622 B1 * | 4/2020 | Sivaraman | G06F 13/4022 |
| 2008/0114937 A1 | 5/2008 | Reid et al. | |
| 2010/0322237 A1 | 12/2010 | Raja et al. | |

(Continued)

OTHER PUBLICATIONS

"Xilinx Unveils Revolutionary Adaptable Computing Product Category", Xilinx, Inc., Mar. 19, 2018,(https://www.xilinx.com/news/press/2018/xilinx-unveils-revolutionary-adaptable-computing-product-category.html).

(Continued)

*Primary Examiner* — Suresh Memula
(74) *Attorney, Agent, or Firm* — Patterson + Sheridan, LLP

(57) ABSTRACT

An example method of implementing an application for a system-on-chip (SOC) having a data processing engine (DPE) array includes determining a graph representation of the application, the graph representation including nodes representing kernels of the application and edges representing communication between the kernels, mapping, based on the graph, the kernels onto DPEs of the DPE array and data structures of the kernels onto memory in the DPE array, routing communication channels between DPEs and circuitry of the application configured in programmable logic of the SOC, and generating implementation data for programming the SOC to implement the application based on results of the mapping and the routing.

20 Claims, 23 Drawing Sheets

(56) References Cited

U.S. PATENT DOCUMENTS

| | | |
|---|---|---|
| 2017/0161419 A1 | 6/2017 | Ganusov et al. |
| 2017/0195258 A1 | 7/2017 | Wang et al. |
| 2017/0207998 A1 | 7/2017 | Fraisse |
| 2017/0220499 A1 | 8/2017 | Gray |
| 2017/0364473 A1* | 12/2017 | Singh .................. G06F 1/10 |
| 2019/0057305 A1 | 2/2019 | Denolf et al. |

OTHER PUBLICATIONS

"Versal: The First Adaptive Computer Acceleration Platform (ACAP)", Xilinx, Inc., WP505 (v1.0), Oct. 2, 2018 (https://www.xilinx.com/support/documentation/white_papers/wp505-versal-acap.pdf).

Bokhari, S.H., "On the mapping problem," IEEE Transactions on Computers, Mar. 1981, vol. 1, No. 3, pp. 207-214.

Xilinx, "Xilinx AI Engines and Their Applications," WP506 (v1.0.2), Oct. 3, 2018, 13 pg., Xilinx, Inc., San Jose, California, USA.

Xilinx, "SDAccel Development Environment User Guide," UG1023 (v.2015.1), Sep. 15, 2015, 95 pg., Xilinx, Inc., San Jose, California, USA.

Xilinx, "Versal Architecture and Product Data Sheet: Overview," DS950 (v1.0), Oct. 2, 2018, 23 pg., Xilinx, Inc., San Jose, California, USA.

Roman Brillu etal, "Flextiles", Rapid Simulation and Performance Evaluation, ACM, 2 Penn Plaza, Suite 701, NY, NY 10121-0701 USA, Jan. 22, 2014.

Jaume Bosch et al, Exploiting Parallelism on GPUs and FPGAs iwth OmpSs, Proceedings of the 1st Workshop on Autotuning and Apadtivity Approaches for Energy Efficient HPC Systems, Andare17, Jan. 1, 2017.

Ingrid Verbauwhede et al, "Architectures and Desgin techniques for energy efficient embedded DSP and multimudia processing" ACM 2 Penn Plaza, Suite 701, NY, NY Jan. 1, 2004.

* cited by examiner

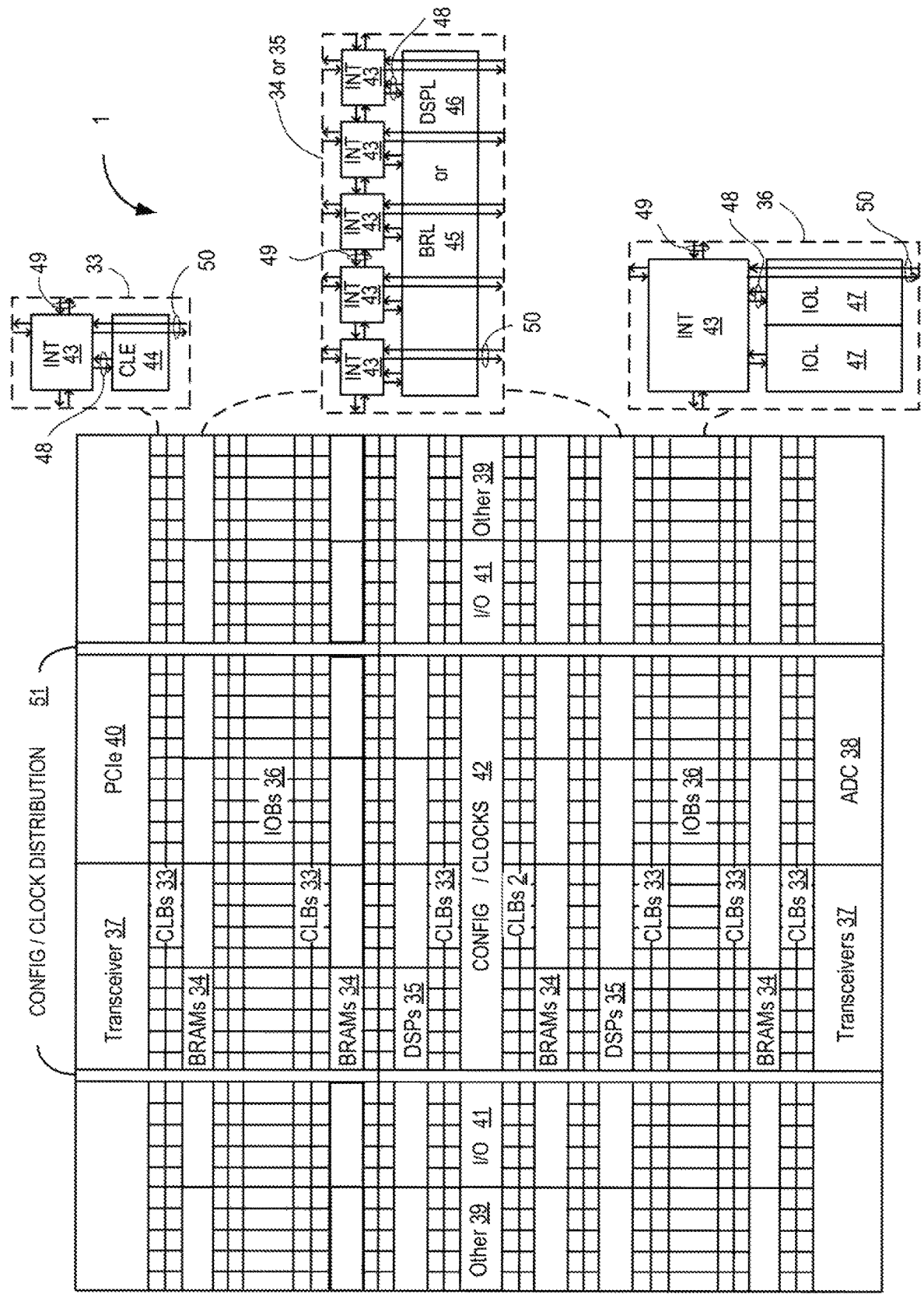

COMPILATION FLOW FOR A HETEROGENEOUS MULTI-CORE ARCHITECTURE

TECHNICAL FIELD

Examples of the present disclosure generally relate to electronic circuit design and, in particular, to a compilation flow for a heterogeneous multi-core architecture.

BACKGROUND

A processor, a system on a chip (SoC), and an application specific integrated circuit (ASIC) can include multiple cores for performing compute operations such as processing digital signals, performing cryptography, executing software applications, rendering graphics, and the like. While there are many multi-core architectures, none of the compilers for these architectures directly address heterogeneous architectures, in particular multi-core processors coupled to reconfigurable/programmable logic (e.g., a field programmable gate array (FPGA) fabric). In addition, existing compilers do not solve the mapping of compute kernels to processor cores and data structures to memory banks, and the routing of stream data and direct memory access (DMA) data between processor cores, and between processor cores and programmable logic.

SUMMARY

Techniques related to a compilation flow for a heterogeneous multi-core architecture are described. In an example, a method of implementing an application for a system-on-chip (SOC) having a data processing engine (DPE) array includes: determining a graph representation of the application, the graph representation including nodes representing kernels of the application and edges representing communication between the kernels; mapping, based on the graph, the kernels onto DPEs of the DPE array and data structures of the kernels onto memory in the DPE array; routing communication channels between DPEs and circuitry of the application configured in programmable logic of the SOC; and generating implementation data for programming the SOC to implement the application based on results of the mapping and the routing.

In another example, non-transitory computer readable medium having stored thereon instructions that when executed by a processor cause the process to perform a method of implementing an application for a system-on-chip (SOC) having a data processing engine (DPE) array, the method including: determining a graph representation of the application, the graph representation including nodes representing kernels of the application and edges representing communication between the kernels; mapping, based on the graph, the kernels onto DPEs of the DPE array and data structures of the kernels onto memory in the DPE array; routing communication channels between DPEs and circuitry of the application configured in programmable logic of the SOC; and generating implementation data for programming the SOC to implement the application based on results of the mapping and the routing.

In another example, a computer system includes: a memory configured to store program code; and a processor configured to execute the program code to implement an application for a system-on-chip (SOC) having a data processing engine (DPE) array by: determining a graph representation of the application, the graph representation including nodes representing kernels of the application and edges representing communication between the kernels; mapping, based on the graph, the kernels onto DPEs of the DPE array and data structures of the kernels onto memory in the DPE array; routing communication channels between DPEs and circuitry of the application configured in programmable logic of the SOC; and generating implementation data for programming the SOC to implement the application based on results of the mapping and the routing.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 21 illustrates a field programmable gate array (FPGA) implementation of the programmable IC of FIG. 20 according to an example.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
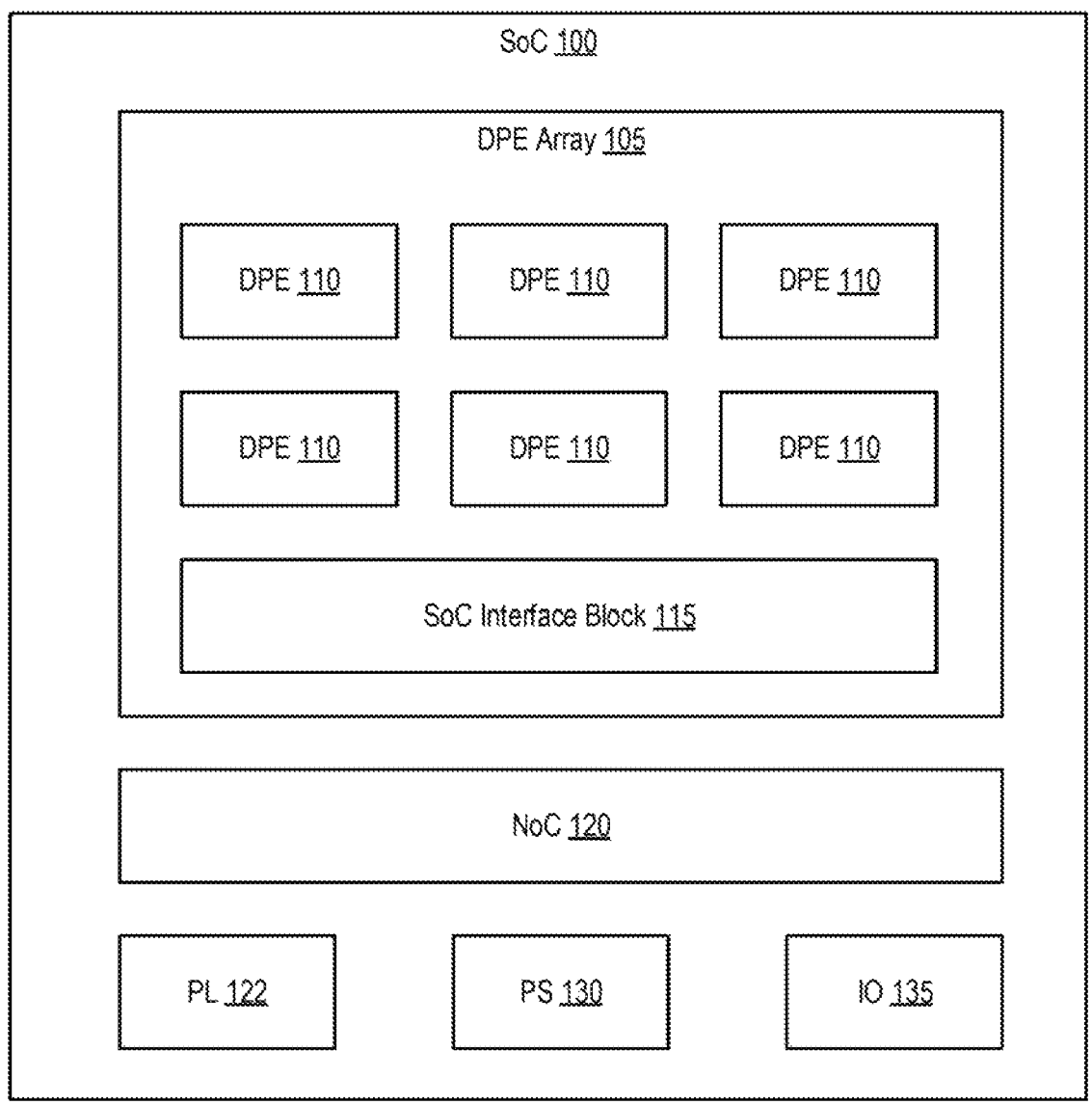
FIG. 1 is a block diagram of a System-on-Chip (SoC) according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques described herein provide a process for taking a graph-based programmatic description of an application for a multi-core architecture of a system-on-chip (SOC) and compiling the application to the multi-core architecture to produce execution binaries for each core and configuration code for programmable components. The compilation steps include transforming the input graph description to an internal representation, performing code analysis and optimization, identifying which computation kernels should be grouped together (e.g., clustering), mapping these groups to specific data processing engines (e.g., cores) and the data structures used by the kernels to local memory. The compilation steps further include routing stream and direct memory access (DMA) data between data processing engines and to and from programmable logic via stream switches. The compilation steps further include generating wrapper code to orchestrate the execution of each data processing engine, generating the configuration code for the DMAs and stream switches, and generating a program for execution by a processing system to control the application. These and further aspects are discussed below with respect to the drawings.

FIG. 1 is a block diagram of a device 100 that includes a data processing engine (DPE) array 105, according to an example. In examples, device 100 is a System-on-Chip (SoC) type of device. In general, an SoC refers to an IC that includes two or more subsystems capable of interacting with one another. As an example, an SoC may include a processor that executes program code and one or more other circuits. The other circuits may be implemented as hardwired circuitry, programmable circuitry, other subsystems, and/or any combination thereof. The circuits may operate cooperatively with one another and/or with the processor. The DPE array 105 includes a plurality of data processing engines (DPEs) 110 that may be arranged in a grid, cluster, or checkerboard pattern in the device 100. Although FIG. 1 illustrates arranging the DPEs 110 in a 2D array with rows and columns, the examples are not limited to this arrangement. Further, the array 105 can be any size and have any number of rows and columns formed by the DPEs 110.

In one embodiment, the DPEs 110 are identical. That is, each of the DPEs 110 (also referred to as tiles or blocks) may have the same hardware components or circuitry. Further, the examples herein are not limited to DPEs 110. Instead, the device 100 can include an array of any kind of processing elements or data processing engines. Moreover, the DPEs 110 could be cryptographic engines or other specialized hardware for performing one or more specialized tasks. As such, the DPEs 110 can be referred to generally as data processing engines.

In FIG. 1, the array 105 includes DPEs 110 that are all the same type (e.g., a homogeneous array). However, in another embodiment, the array 105 may include different types of engines. For example, the array 105 may include DPEs 110, cryptographic engines, forward error correction (FEC) engines, and the like. Regardless if the array 105 is homogenous or heterogeneous, the DPEs 110 can include connections to memory modules in neighboring DPEs 110 which permit the DPEs 110 to share the memory modules as described in more detail below.

In one embodiment, the DPEs 110 are formed from non-programmable logic—i.e., are hardened. One advantage of doing so is that the DPEs 110 may take up less space in the device 100 relative to using programmable logic to form the hardware elements in the DPEs 110. That is, using hardened or non-programmable logic circuitry to form the hardware elements in the DPEs 110 such as program memories, an instruction fetch/decode unit, fixed-point vector units, floating-point vector units, arithmetic logic units (ALUs), multiply accumulators (MAC), and the like can significantly reduce the footprint of the array 105 in the device 100. Although the DPEs 110 may be hardened, this does not mean the DPEs 110 are not programmable. That is, the DPEs 110 can be configured when the device 100 is powered on or rebooted to perform different functions or tasks.

The DPE array 105 also includes an SoC interface block 115 that serves as a communication interface between the DPEs 110 and other hardware components in the device 100. In this example, the device 100 includes a network on chip (NoC) 120 that is communicatively coupled to the SoC interface block 115. Although not shown, the NoC 120 may extend throughout the device 100 to permit the various components in the device 100 to communicate with each other. For example, in a physical implementation, the DPE array 105 may be disposed in an upper right portion of the integrated circuit forming the device 100. However, using the NoC 120, the array 105 can nonetheless communicate with various subsystems, for example, programmable logic (PL) 120, a processor subsystem (PS) 130 or input/output (I/O) 135 which may disposed at different locations throughout the device 100.

In addition to providing an interface between the DPEs 110 and the NoC 120, the SoC interface block 115 may also provide a connection directly to a communication fabric in the PL 122. In one embodiment, the SoC interface block 115 includes separate hardware components for communicatively coupling the DPEs 110 to the NoC 120 and to the PL 122 that is disposed near the array 105 in the device 100.

Although FIG. 1 illustrates one block of PL 122, the device 100 may include multiple blocks of PL 122 (also referred to as configuration logic blocks) that can be disposed at different locations in the device 100. For example, the device 100 may include hardware elements that form a field programmable gate array (FPGA). However, in other embodiments, the device 100 may not include any PL 122—e.g., the device 100 is an ASIC.

Figure 2:
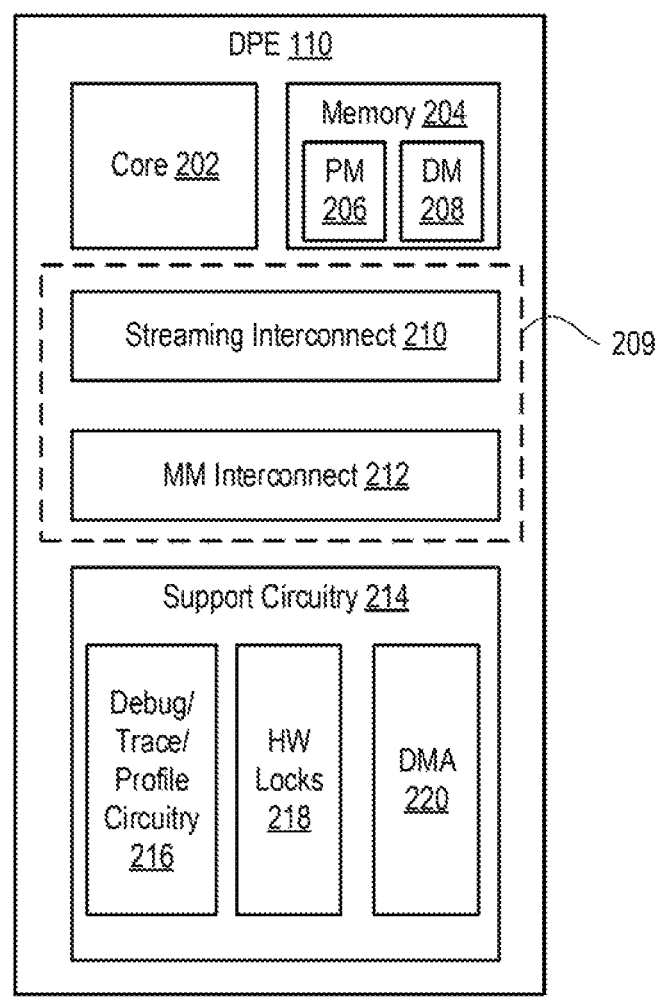
FIG. 2 is a block diagram depicting a tile circuit according to an example.

FIG. 2 is a block diagram depicting a DPE 110 according to an example. The DPE 110 can be used to implement a DPE in a DPE array as discussed above and shown in FIG. 1. The DPE 110 includes a core 202, memory 204, DPE interconnect 209, and support circuitry 214. The DPE interconnect 209 includes streaming interconnect 210 and memory-mapped (MM) interconnect 212. In an example, the support circuitry 214 includes debug/trace/profile circuitry 216, hardware (HW) synchronization circuitry ("HW locks 218"), and direct memory access (DMA) circuitry ("DMA 220"). The memory 204 includes program memory ("PM 206") and data memory ("DM 208").

The core 202 includes one or more compute units for processing data according to instruction(s) stored in the PM 206. In an example, the core 202 includes a very-long instruction word (VLIW) processor, a single instruction, multiple data (SIMD) or vector processor, or a VLIW SIMD/vector processor. In an example, the PM 206 is private to the core 202 (e.g., the PM 206 stores instruction(s) only for use by the core 202 in the DPE 200). In an example, the PM 206 comprises a single-ported random access memory (RAM). The PM 206 can be coupled to the MM interconnect 212 for configuration and loading of instructions. In an example, the PM 206 supports parity, error-correcting code (ECC) protection and reporting, or both parity and ECC. For example, the PM 206 can support 9-bit ECC and be able to correct a 1-bit error or 2-bit errors in a program instruction (e.g., 128 bits).

The core 202 can be directly coupled to the streaming interconnect 210 to receive input stream(s) and/or provide output stream(s). In addition, the core 202 can read and write data to the DM 208 in the DPE 200. As discussed further below, the core 202 in the DPE 200 can also access the DM in one or more neighboring tile circuits (e.g., north, south, east, and west neighboring tile circuits). In an example, as discussed further below, the core 202 can also include a direct connection with the data processing engine in one or more neighboring tiles for forwarding accumulator output (e.g., input and output cascading connection(s)). In an example, the core 202 sees the DM 208 in the DPE 200 and other DM(s) in neighboring tile(s) as one contiguous block of memory. The core 202 can also include an interface to the HW locks 218 and an interface to the debug/trace/profile circuitry 216. The debug/trace/profile circuitry 216 can include trace, debug, and/or profile circuitry.

The MM interconnect 212 can be an AXI memory-mapped interconnect or the like configured for transmission of data using address transactions between components. In an example, the MM interconnect 212 is used for configuration, control, and debugging functionality for the DPE 200. The MM interconnect 212 includes one or more switches that route transactions based on address. Circuitry can use the MM interconnect 212 to access the memory 204, the core 202, the DMA 220, and configuration registers in the DPE 200.

The streaming interconnect 210 can be an Advanced eXtensible Interconnect (AXI) streaming interconnect or the like configured for transmission of streaming data between components. The streaming interconnect 210 is used for transferring data between the DPE 200 and external circuits. The streaming interconnect 210 can support both circuit switching and packet switching mechanisms for both data and control.

In an example, as described further below, the DM 208 can include one or more memory banks (e.g., random access memory (RAM) banks). The DMA 220 is coupled between the streaming interconnect 210 and the DM 208. The DMA 220 is configured to move data from the streaming interconnect 210 to the DM 208 and move data from the DM 208 to the streaming interconnect 210. In this manner, an external circuit (e.g., a circuit configured in programmable logic or a circuit in an embedded processing system of the IC) can read data from and write data to the DM 208 through the streaming interconnect 210 using DMA. The DMA 220 can be controlled through the MM interconnect 212 and/or the streaming interconnect 210. In an example, the DM 208 supports parity, error-correcting code (ECC) protection and reporting, or both parity and ECC. For example, the DM 208 can support 9-bit ECC (e.g., 128-bits data).

The HW locks 218 could be used to lock particular memory banks of the DM 208 for access by the core 202, another data processing engine in another tile, or the DMA 220. The HW locks 218 provide synchronization between neighboring data processing engines in neighboring tiles, between the core 202 and the DMA 220, and between the core 202 and an external circuit (e.g., an external processor). The HW locks 218 can also be used to lock a particular buffer in the DM 208, which may be stored in one or more memory banks or in a portion of a single memory bank. The debug/trace/profile circuitry 216 is configured to provide debug, trace, and profile functions. The debug/trace/profile circuitry 216 can trace events generated by circuits in the DPE 200. The debug/trace/profile circuitry 216 can provide profile functionality, for example, configurable performance counters.

Figure 3:
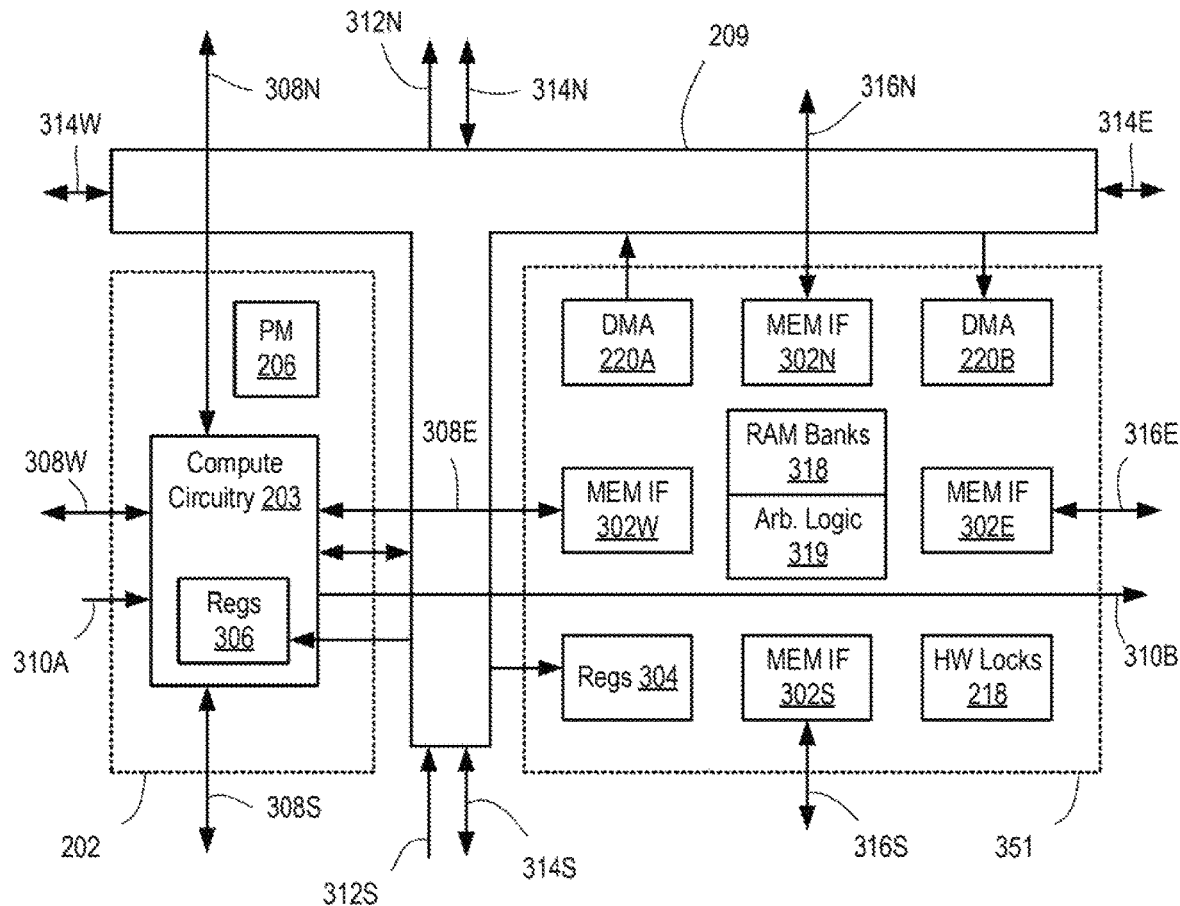
FIG. 3 is a block diagram depicting the tile circuit of FIG. 2 in more detail according to an example.

FIG. 3 is a block diagram depicting the DPE 200 in more detail according to an example. In the example, the DPE 200 includes core 202, a memory module 351, and DPE interconnect 209. The core 202 includes the compute circuitry 203 and the PM 206. The memory module 351 includes memory interfaces 302N, 302S, 302E, and 302W (collectively memory interfaces or individually "mem IF"), RAM banks 318, the HW locks 218, registers ("regs 304"), a DMA interface 204A, and a DMA interface 220B. The compute circuitry 203 includes registers ("regs 306"). The DPE interconnect 209 includes the MM interconnect 212 and the streaming interconnect 210 (shown in FIG. 2). Both the MM interconnect 212 and the streaming interconnect 210 can access the RAM banks 318. The RAM banks 318 include arbitration logic 319 per bank. The arbitration logic 319 is configured to control which interface (N, S, E, W, DMA, external PS, etc.) has access to which bank. Further details of the DPE interconnect 209 are discussed below with respect to the example of FIG. 4.

The DPE interconnect 209 includes a streaming connection 314W to a west tile, a streaming connection 314E to an east tile, a streaming connection 314N to a north tile, and a streaming connection 314S to a south tile. Each streaming connection 314 includes one or more independent streaming interfaces (e.g., busses), each having a specific bit width. The DPE interconnect 209 also includes a memory-mapped connection 312S from a south tile and a memory-mapped connection 312N to a north tile. Although only north and south MM connections are shown, it is to be understood that the DPE interconnect 209 can include other configurations for the MM interconnect (e.g., east-to-west, west-to-east, north-to-south, and the like). It is to be understood that the DPE interconnect 209 can include other arrangements of streaming and memory-mapped connections than shown in the example of FIG. 3. In general, the DPE interconnect 209 includes at least one streaming connection 314 and at least one memory-mapped connection 312.

The compute circuitry 203 includes a connection 308W to memory circuitry in a west tile, a connection 308S to memory circuitry in a south tile, a connection 308N to memory circuitry in a north tile, and a connection 308E to the memory module 351. The compute circuitry 203 include a streaming interface to the DPE interconnect 209. The compute circuitry 203 also includes a connection 310A from a core in the west tile and a connection 310B to a core in the east tile (e.g., cascading connections). It is to be understood that the DPE can include other arrangements of memory and cascading connections than shown in the example of FIG. 3. In general, the compute circuitry 203 includes at least one memory connection and can include at least one cascading connection.

The mem IF 302W is coupled to the memory connection 308E of the compute circuitry 203. The mem IF 302N is coupled to a memory connection of the data processing engine in the north tile. The mem IF 302E is coupled to a memory connection of the data processing engine in the east tile. The mem IF 302S is coupled to a memory connection of the data processing engine in the south tile. The mem IF 302W, 302N, 302E, and 302S are coupled to the RAM banks 318. The DMA 220A includes an output coupled to the DPE interconnect 209 for handling memory to interconnect streams. The DMA 220B includes an input coupled to the DPE interconnect 209 for handling interconnect to memory streams. The regs 304 and the regs 306 are coupled to the DPE interconnect 209 to receive configuration data therefrom (e.g., using the memory-mapped interconnect).

Figure 4:
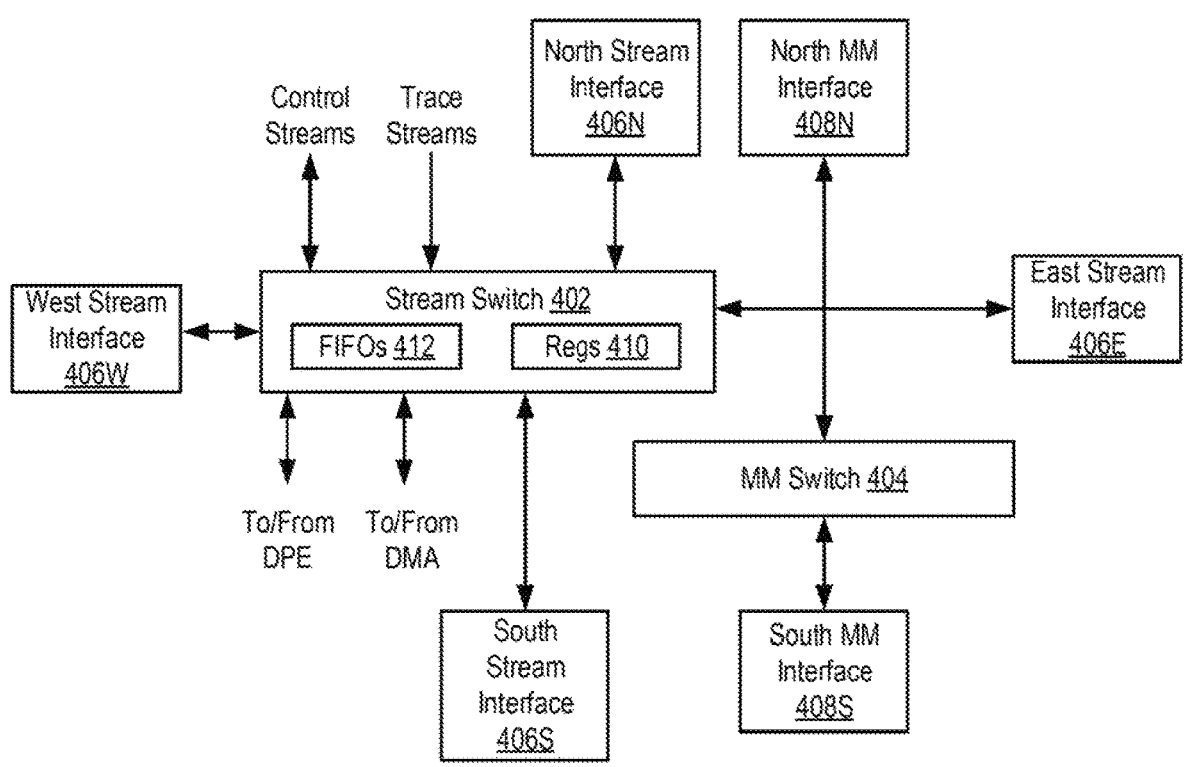
FIG. 4 is a block diagram depicting tile interconnect circuitry according to an example.

FIG. 4 is a block diagram depicting the DPE interconnect 209 according to an example. The DPE interconnect 209 includes a stream switch 402 and an MM switch 404. The stream switch 402 is coupled to a west stream interface 406W, a north stream interface 406N, an east stream interface 406E, and a south stream interface 406S. The west stream interface 406W receives and provides streams to the DPE interconnect of a west tile. The north stream interface 406N receives and provides streams to the DPE interconnect of a north tile. The west stream interface 406W receives and provides streams to the DPE interconnect of a west tile. The south stream interface 406S receives and provides streams to the DPE interconnect of a south tile. The MM switch 404 is coupled to a north MM interface 408N and a south MM interface 408S. The north MM interface 408N is coupled to the DPE interconnect in the north tile. The south MM interface 408S is coupled to the DPE interconnect in the south tile.

The stream switch 402 includes first-in-first-out (FIFO) circuits (FIFOs 412) and registers (regs 410). The FIFOs 412 are configured to buffer streams passing through the stream switch 402. The regs 410 store configuration data for the stream switch 402 that controls the routing of streams through the stream switch. The regs 410 can receive configuration data from the MM switch 404. The stream switch 402 can include an additional interface to the compute circuitry 203 and an additional interface to the DMA circuitry 220. The stream switch 402 can send and receive control streams and receive trace streams (e.g., from the debug/trace/profile circuitry 216).

Figure 5:
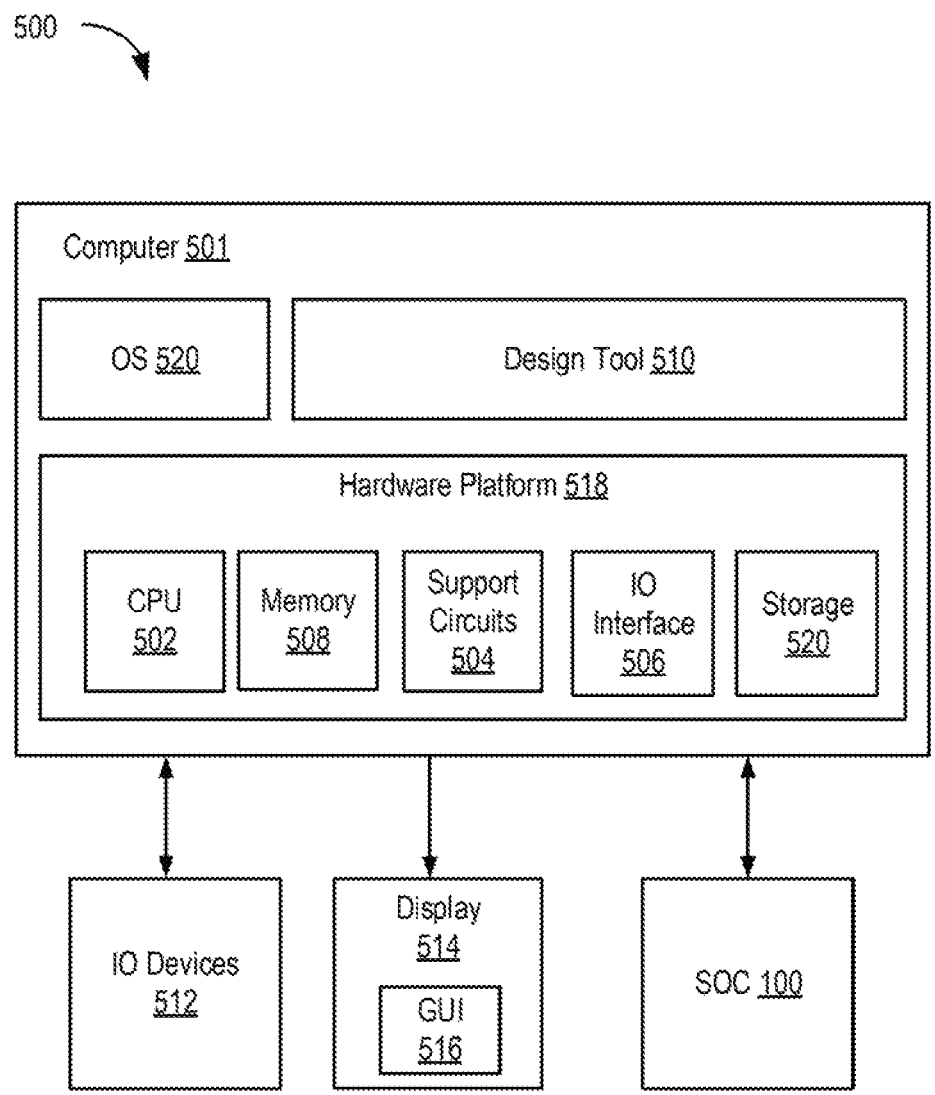
FIG. 5 is a block diagram depicting an example of a circuit design system according to an example.

FIG. 5 is a block diagram depicting an example of a circuit design system 500 according to an example. The circuit design system 500 includes a computer 501 coupled to input/output (IO) devices 512, a display 514, and an SOC 100. The computer 501 includes a hardware platform 518 can include conventional components of a computing device, such as a central processing unit (CPU) 502, system memory 508, various support circuits 504, storage 520, and an IO interface 506. The CPU 502 can include one or more microprocessors. The CPU 502 is configured to execute instructions that perform one or more operations described herein. The instructions can be stored in system memory 508, storage 520, or any other memory in the hardware platform 518 (e.g., cache memory). The system memory 508 includes devices that store information and can include, for example, random access memory (RAM), read-only memory (ROM), or a combination thereof. The storage 520 includes local storage devices, such as hard disks, flash memory modules, solid state disks, optical disks, and the like. The storage 520 can also include interface(s) configured for communication with one or more network data storage systems. The support circuits 504 can include conventional cache, power supplies, clock circuits, data registers, IO interfaces, and the like. The IO interface 506 includes conventional interfaces to the computer 501 known in the art. The IO interface 506 can be coupled to the 10 devices 512, which can include conventional keyboard, mouse, and the like. The 10 interface 506 can also be coupled to the display 514, which can present a GUI 516 to a user.

The computer 501 further includes a software platform comprising an operating system (OS) 522 and a design tool 510. The OS 522 and the design tool 510 include instructions that are executed by the CPU 502. The OS 522 can include any known operating system, such as Linux®, Microsoft Windows®, Mac OS®, and the like. The design tool 510 is an application that executes within the OS 522, which provides an interface to the hardware platform 518. Operation of the design tool 510 is discussed below. An example design tool that can be adapted to include the techniques described herein is the Vivado® Design Suite available from Xilinx, Inc. of San Jose, Calif., although other circuit design tools can be similarly adapted.

Compiler Flow for a Heterogeneous Multi-Core Architecture

Figure 6:
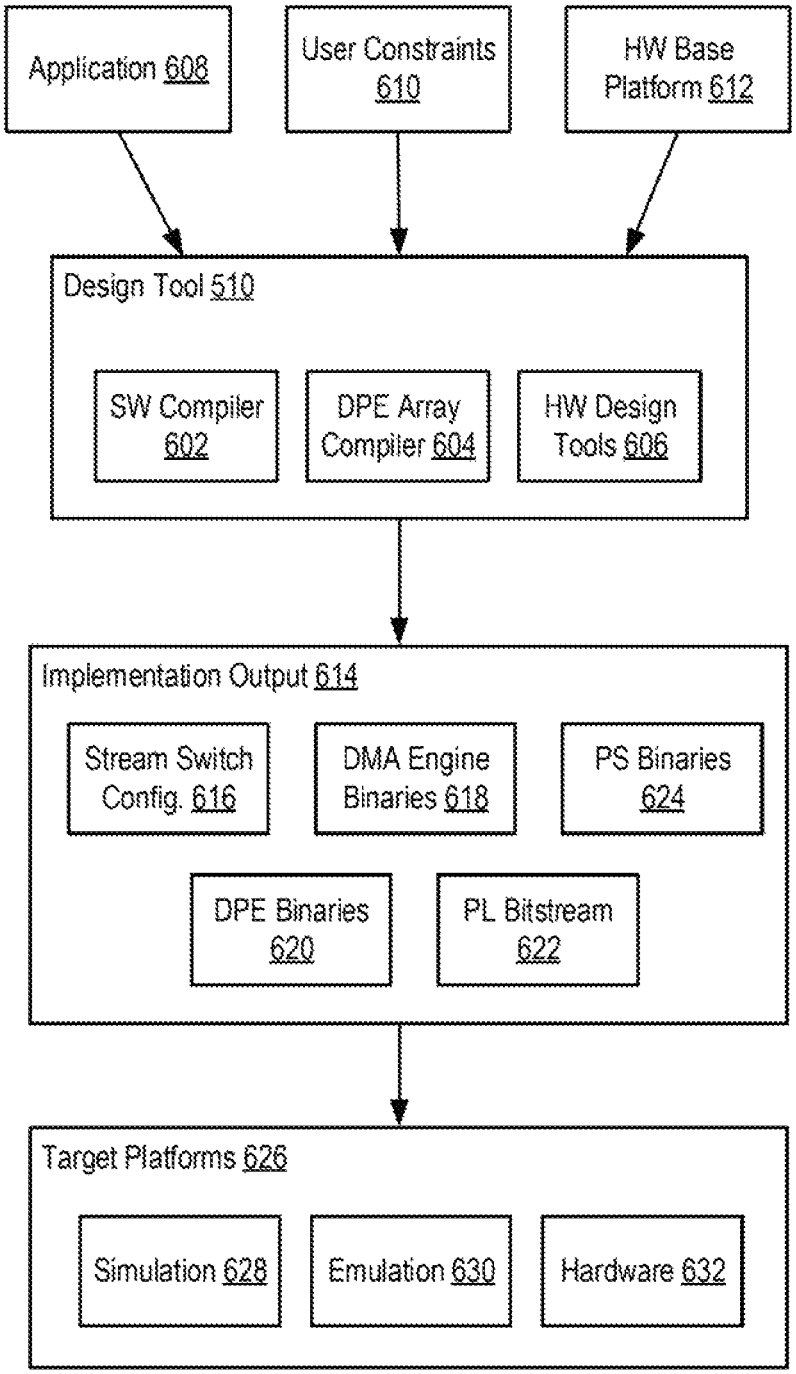
FIG. 6 is a block diagram depicting implementation of an application for a target platform according to an example.

FIG. 6 is a block diagram depicting implementation of an application for a target platform according to an example. The design tool 510 includes a software compiler ("SW compiler 602"), a DPE array compiler 604, and hardware design tools ("HW design tools 606"). The design tool 510 receives an application 608, user constraints 610, and a hardware base platform ("HW base platform 612"). The user defines the application 608, which is to be implemented for the SoC 100. The application 608 includes portions that map to the PL 122, the PS 130, and the DPE array 105. The SW compiler 602 is configured to compile the portion of the application 608 that maps to the PS 130, which can include source code defined using any programming language (e.g., C, C++, and the like). The HW design tools 606 are configured to implement the portion of the application 608 that maps to the PL 122, which can include circuit descriptions defined using any hardware description language (HDL), register transfer language (RTL), high-level synthesis (HLS) models, concurrent programming language (e.g., SystemC), or the like. The DPE array compiler 604 is configured to compile the portion of the application 608 that targets the DPE array 105, which is defined further below.

Figure 7:
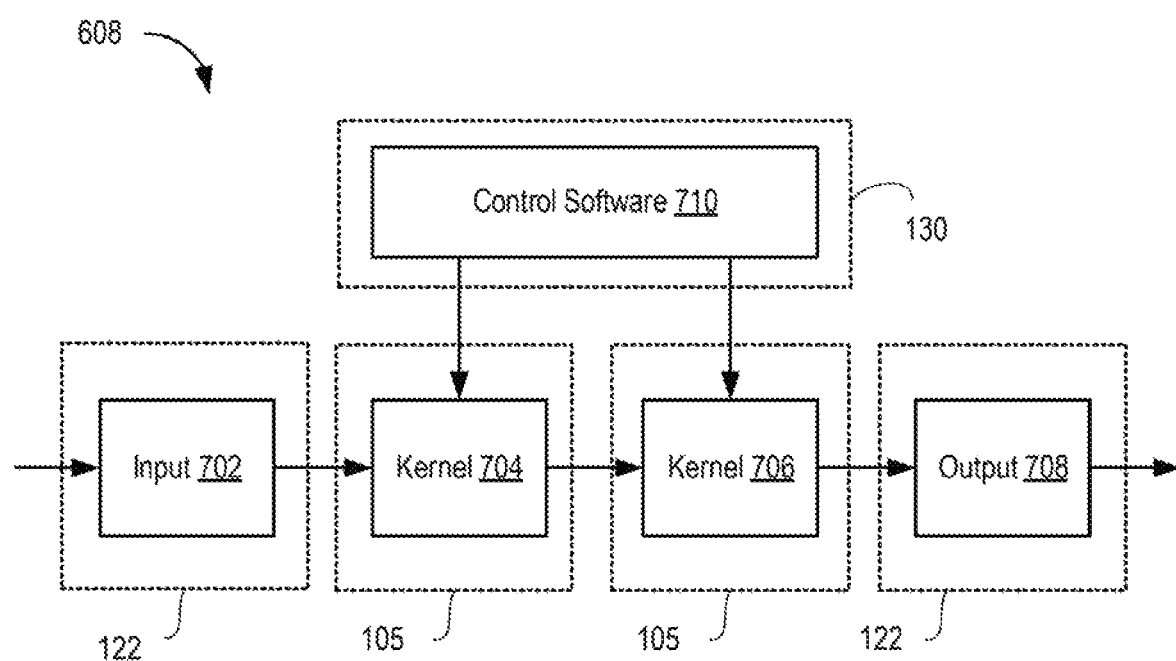
FIG. 7 is a block diagram depicting an application according to an example.

FIG. 7 is a block diagram depicting the application 608 according to an example. A user interacts with the design tool 510 to define the application 608 targeting the SOC 100.

In the example, the application 608 includes an input circuit 702, a kernel 704, a kernel 706, an output circuit 708, and control software 710. The input circuit 702 is coupled to the kernel 704 and provides data to the kernel 704. The kernel 704 is coupled to the kernel 706 and provides data to the kernel 706. The kernel 706 is coupled to the output circuit 708 and provides data to the output circuit 708. The control software 710 controls the kernel 704 and the kernel 706 and provides data thereto. In general, an application 608 includes one or more circuits, one or more kernels, and control software connected to each other in a specific fashion depending on the design.

In the example, the input circuit 702 comprises digital logic (and optionally analog logic) configured to communicate with external systems/circuits, as well as provide data to the kernel 704 for processing. The input circuit 702 maps to the PL 122. Likewise, the output circuit 708 comprises digital logic (and optionally analog logic) configured to communicate with external systems/circuits, as well as receive data from the kernel 706 that has been processed. The output circuit 708 maps to the PL 122. In an example, the kernels 704 and 706 comprise a programmatic description of data processors. The kernels 704 and 706 map to the DPE array 105. The control software 710 is a programmatic description of a controller for the kernels 704 and 706. In an example, the control software 710 maps to the PS 130.

Returning to FIG. 6, the implementation data 614 includes stream switch configuration code 616, DMA engine configuration code 618, PS binaries 624, DPE binaries 620, and a PL bitstream 622. The SW compiler 602 generates the PS binaries 624 from the source code of the application 608 that targets the PS 130 (e.g., the control software 710). The PS binaries 624 are configured to target a particular microprocessor architecture (e.g., x86, ARM®, and the like). The HW design tools 606 generate the PL bitstream 622 from the portion of the application 608 that targets the PL 122 (e.g., the input circuit 702 and the output circuit 708). The PL bitstream 622 targets a particular SOC device. The DPE array compiler 604 generates the stream switch configuration code 616, the DMA engine configuration code 618, and the DPE binaries 620 based on the portion of the application 608 that targets the DPE array 105 (e.g., the kernels 704 and 706). The stream switch configuration code 616 includes data for programming stream switches 402 in the DPE interconnect 209. The DMA engine configuration code 618 includes data for programming DMA circuitry 220 in memory modules 351 of DPEs 110. The DPE binaries 620 include code for execution by the compute circuitry 203 in cores 202 of DPEs 110.

The implementation output 614 is configured for implementation on target platforms 626. The target platforms 626 include simulation platforms ("simulation 628"), emulation platforms ("emulation 630"), and hardware platforms ("hardware 632"). The hardware 632 includes the SOC 100. The simulation and emulation platforms 628 and 630 simulate/emulate the hardware 632.

Figure 8:
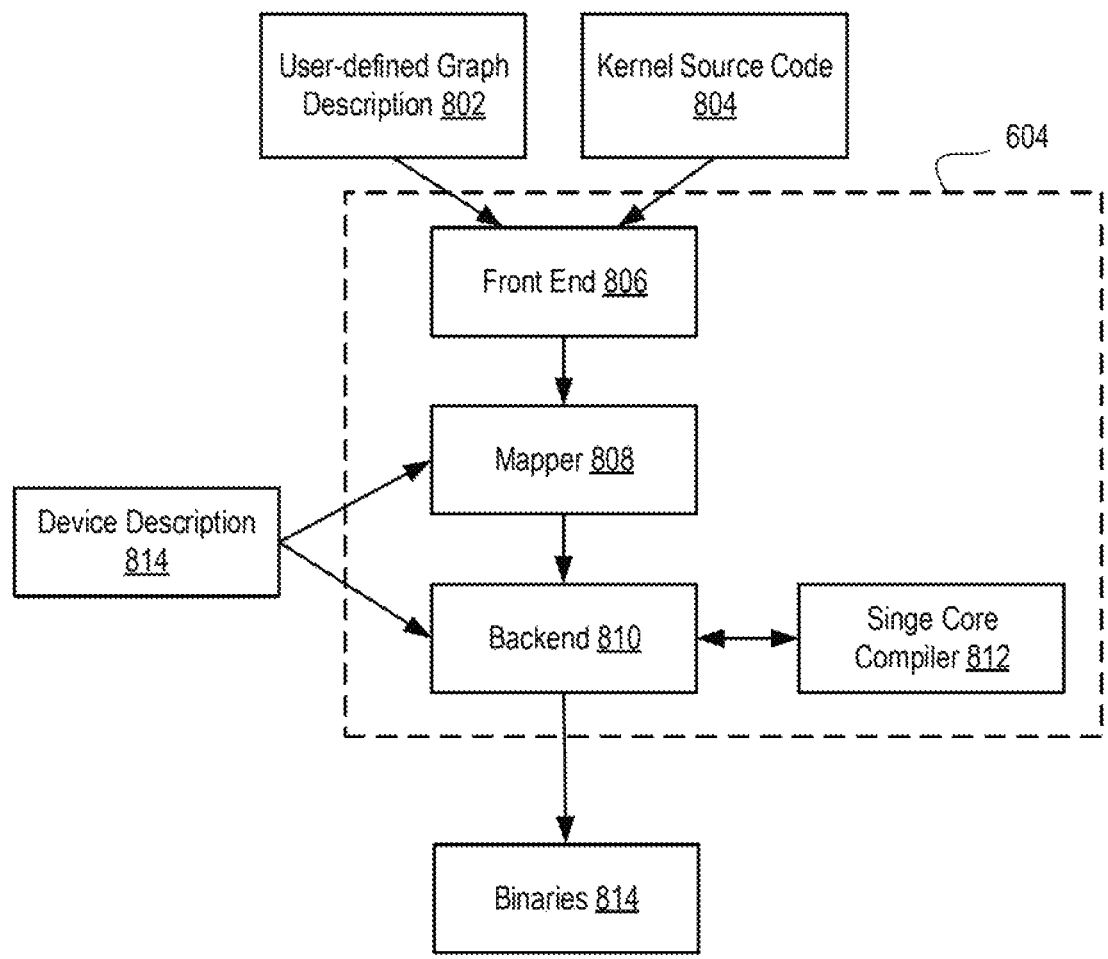
FIG. 8 is a block diagram depicting a data processing engine (DPE) array compiler according to an example.

FIG. 8 is a block diagram depicting the DPE array compiler 604 according to an example. The DPE array compiler 604 includes a front end 806, a mapper 808, a backend 810, and a single core compiler 812. Although the DPE array compiler 604 is described as having discrete components, it is to be understood that the functionality of those components can be implemented using more or less components in different configurations than the example shown in FIG. 8. The portion of the application 608 that targets the DPE array 105 includes a user-defined graph description 802 and kernel source code 804. The user-defined graph description 802 describes the components and their connectivity (e.g., the input circuit 702, the kernels 704 and 706, the output circuit 708, and the control software 710). The kernel source code 804 provides programmatic descriptions of functions to be implemented in DPEs 110 of the DPE array 105.

The user-defined graph description 802 can be specified using various programming languages (e.g., C, C++, etc.) or data structure languages (e.g., XML, JSON, etc.). One example of the user-defined graph description 802 specified in C++ is shown below:

```
using namespace cardano;
class radio:
    cardano::graph {
public:
    cardano::kernel a,b,c,d,e,f;
    radio( ){
        a=kernel::create(polarclip);
        b=kernel::create(feedback);
        c=kernel::create(equalizer);
        d=kernel::create(fir_tap11);
        e=kernel::create(fir_tap7);
        f=kernel::create(scale);
        fabric<fpga>(a);
        fabric<fpga>(f);
        connect<stream, window<64,8>> (a.out[0], b.in[0]);
        connect<window<32>> (b.out[0], c.in[0]);
        connect<window<32, 24>> (c.out[0], d.in[0]);
        connect<window<32, 16>> (d.out[1], e.in[0]);
        connect<window<32, 8>> (e.out[0], b.in[1]);
        connect<window<16>, stream> (d.out[0], f.in[0]);
    }
}
```

In the example above, the radio class is derived from a class library (cardano) with graph building primitives. Using these primitives, the user-defined graph description 802 defines compute nodes a, b, c, d, e, and f. The compute nodes a and f are circuits mapped to the PL 122. The compute nodes b, c, d, and e are kernels mapped to the DPE array 105. The circuit a is connected to the kernel b using a DMA streaming connection. The kernel b is connected to the kernel c; the kernel c is connected to the kernel d; the kernel d is connected to the kernel e; and the kernel e is connected to the kernel b, where each such connection is through memory blocks in the DPE 105. The kernel d is connected to the circuit F through a DMA streaming connection.

The user-defined graph description 802 can also include a top-level description of the platform. For example:

```
radio mygraph;
simulation::platform<1,1> platform("in.txt", "out.txt");
connect< > net0(platform.src[0], mygraph.in);
connect< > net1(platform.sink[0], mygraph.out);
```

In the example above, the user instantiates the radio class (mygraph) and sets up a simulation target. The user can also specify a control program for execution on the PS 130, such as:

```
int main(void) {
    mygraph.init( )
    mygraph.run( )
    mygraph.end( )
    return 0;
}
```

In the example above, the user initializes mygraph, executes mygraph, and ends mygraph for purposes of simulation in the simulation platform.

The kernel source code 804 provides a source code description for each compute node targeting a DPE 110 (e.g., compute nodes b, c, d, and e in the example above). The kernel source code 804 can be defined using any programming language (e.g., C, C++, etc.). Example C++ source code for defining the compute node c (equalizer) is shown below:

```
void         equalizer     (input_window_cint16*inputw,
output_window_cint16*outputw) {
   v32cint16 sbuff=null_v32cint16( )
   for (unsigned i=0; i<LSIZE; i++)
   chess_loop_range(2,)
   chess_prepare_for_pipelining
   {
   v4cacc48 acc;
   v8cint16 coe, vdata;
   coe=*coeff++; LD coefficients 0:7
   window_readincr(inputw, vdata);
   sbuff=upd_w0(sbuff, vdata); LDw0 data 0:7-0:7|X|X|X
   acc=mul4_nc(sbuff, 1, 0x3210, 1, coe, 0, 0x0000, 1); //
d01:d05| c0:c1
   acc=mac4_nc(acc, sbuff, 3, 0x3210, 1, coe, 2, 0x0000, 1);
// d03:d07 | c2:c3
   window_readincr(inputw, vdata);
   sbuff=upd_w1(sbuff, vdata);
   acc=mac4_nc(acc, sbuff, 5, 0x3210, 1, coe, 4, 0x0000, 1);
// d05:d09 | c4:c5
   acc=mac4_nc(acc, sbuff, 7, 0x3210, 1, coe, 6, 0x0000, 1);
// d07:d11 | c6:c7
   coe=*coeff++; LD coefficients 8:15
   window_readincr(inputw, vdata);
   sbuff=upd_w2(sbuff, vdata); LDw2 data 16:23-0:7|8:
15|16:23|X
   window_writeincr(outputw,fsrs(acc,shift));
   }
}
```

In the example, the compute node c (equalizer) is implemented using a C/C++ function with input parameters defining the input of the compute node. The code includes pragmas to assist in scheduling for performance. The code includes intrinsics for performing vectorized computations and application programming interfaces (APIs) for accessing data.

The front end 806 is configured to process the user-defined graph description 802 and generate a directed graph as an internal representation. In the directed graph, nodes represent compute nodes and edges represent connections between compute nodes. The mapper 808 is configured to implement the directed graph for a DPE array 105 in a target device based on a device description 814. The mapper 808 partitions the compute nodes into groups, and maps the partitioned compute nodes to DPEs 110. The backend 810 is configured to route the connections between DPEs 110 and circuits in the PL 122, then invoke the single core compiler 812 to generate DPE binaries, and also generate stream switch and DMA configuration code based on the output of the mapper 808.

Figure 9A:
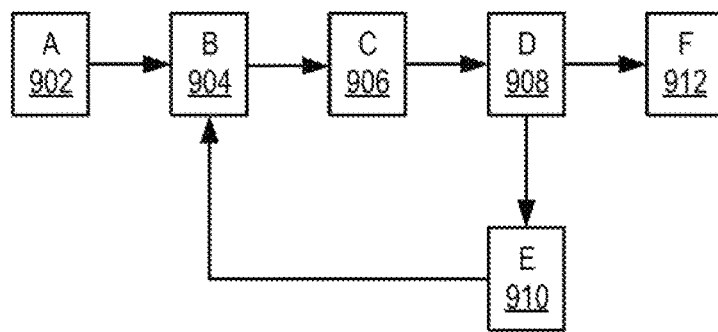
FIGS. 9A-9D are block diagrams depicting an example directed graph representation of a portion of the application targeting the DPE array according to an example.
Figure 9B:
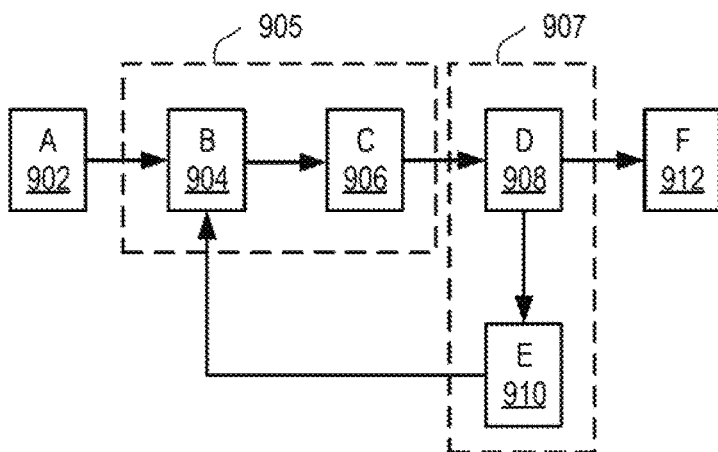
Figure 9C:
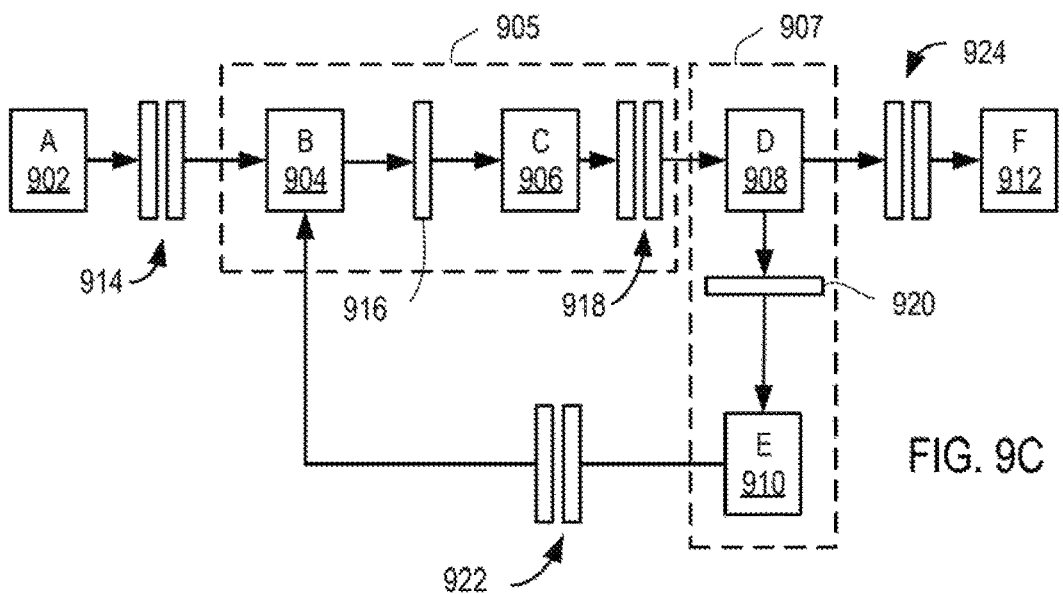
Figure 9D:
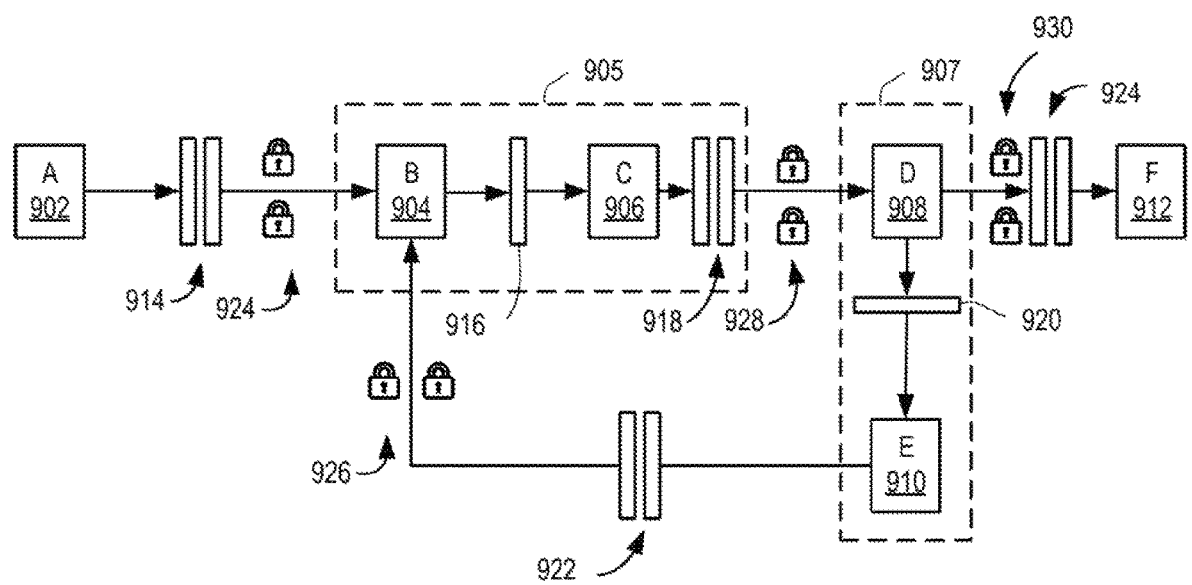
Figure 10:
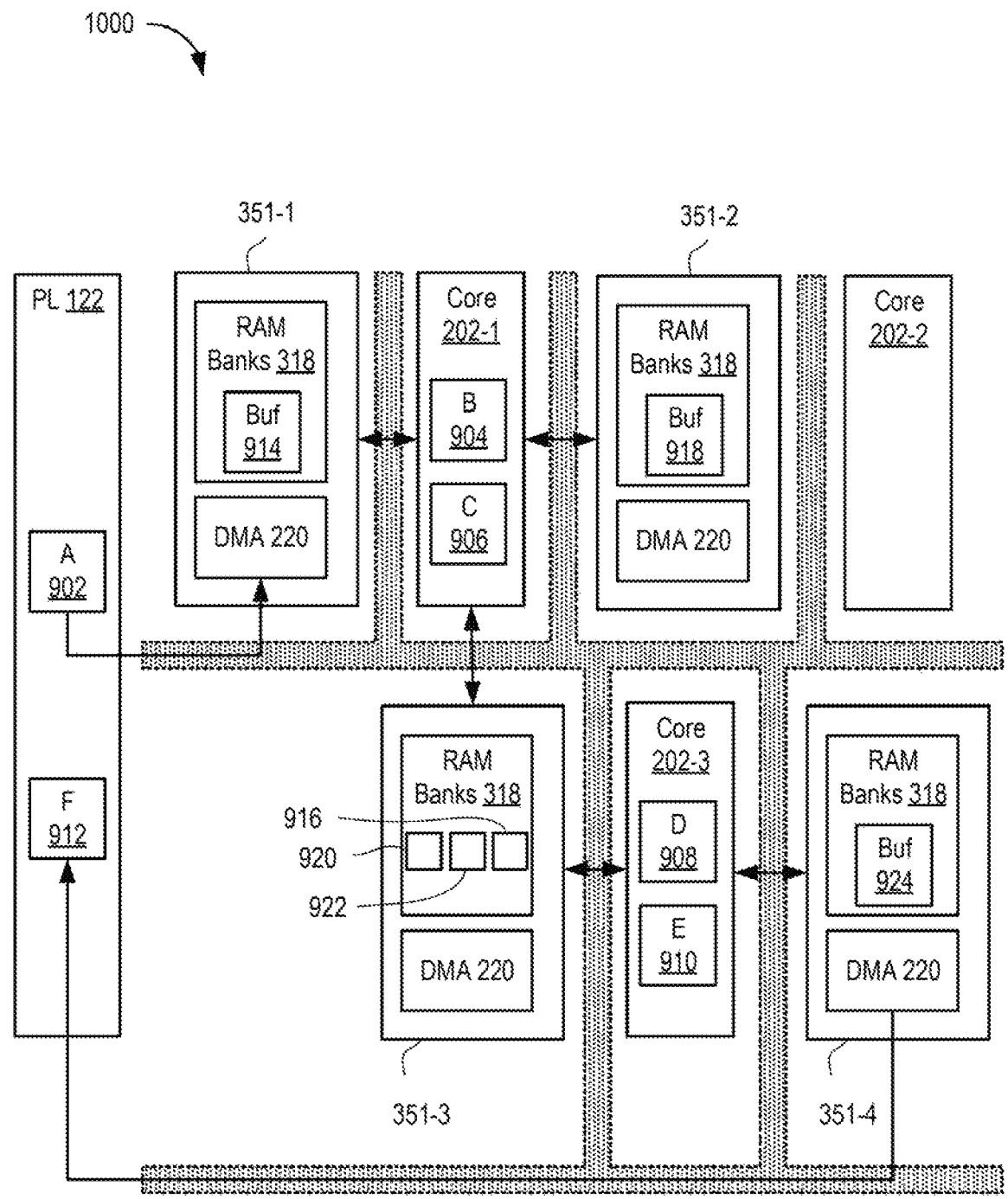
FIG. 10 is a block diagram depicting placement and routing of the directed graph in the DPE array according to an example.

FIGS. 9A-9D are block diagrams depicting an example directed graph representation of a portion of the application 608 targeting the DPE array 105 according to an example. FIG. 10 is a block diagram depicting placement and routing of the directed graph in the DPE array 105. The directed graph in FIGS. 9A-9D represents the example described above for the user-defined graph description 802 having the compute nodes a, b, c, d, e, and f, where compute nodes a and f map to the PL 122 and compute nodes b, c, d, and e map to the DPE array 105. As shown in FIG. 9A, the directed graph includes nodes A 902, B 904, C 906, D 908, E 910, and F 912. The node A is connected to the node B; the node B is connected to the node C; the node C is connected to the node D; the node D is connected to the node F and the node E; and the node E is connected to the node B. FIGS. 9B-9D depict how the mapper 808 processes the directed graph through various steps, as described further below.

Figure 11:
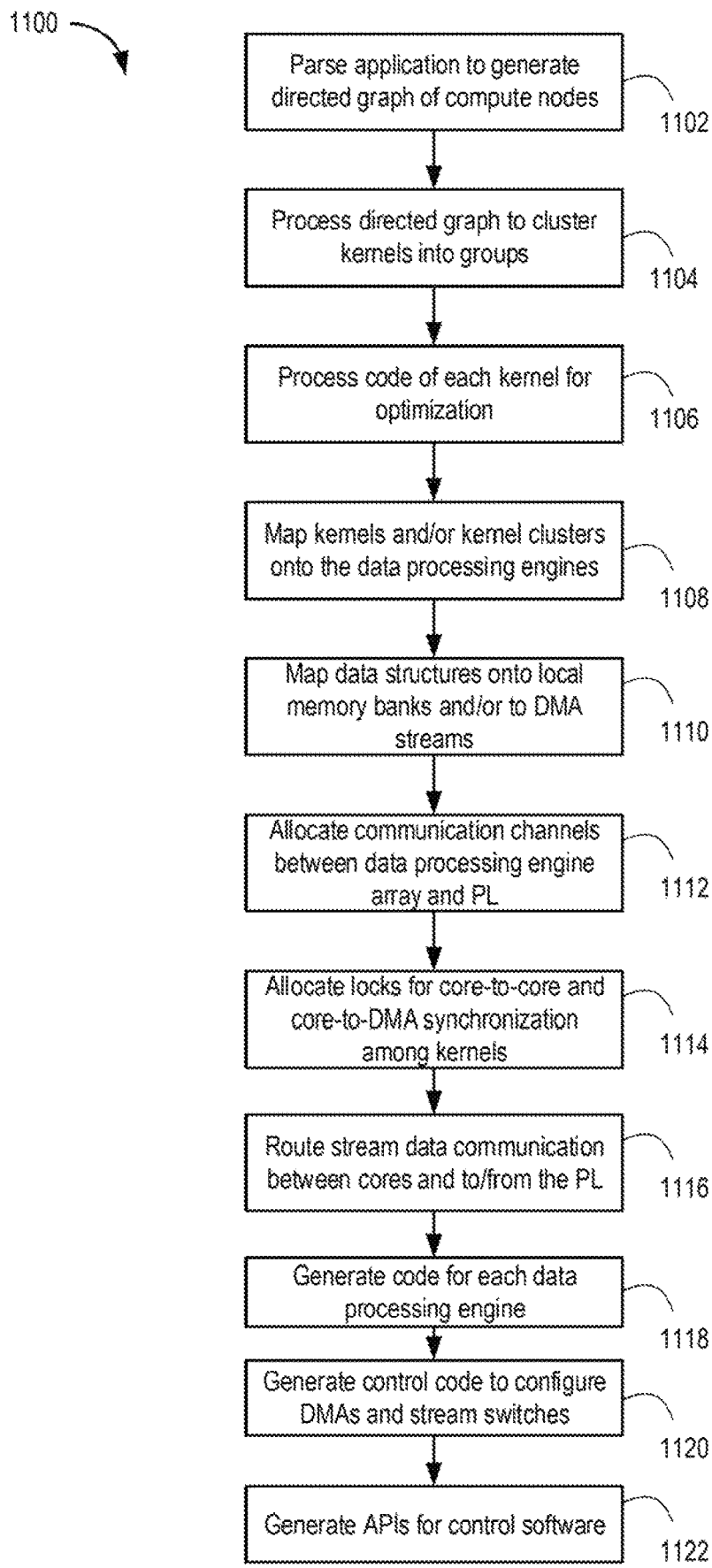
FIG. 11 is a flow diagram depicting a method of generating code and configuration data for a data processing engine array of an SOC according to an example.

FIG. 11 is a flow diagram depicting a method 1100 of generating code and configuration for the DPE array 105 of the SOC 100 according to an example. The method 1100 is performed by the design tool 510 executing on the computer system 501. As noted above, the design tool 510 is configured to process the application 608 to generate code and configuration data for the SOC 100. The method 1100 is performed by the DPE array compiler 604.

The method 1100 begins at step 1102, where the DPE array compiler 604 parses the application 608 and generates a directed graph based on a user-defined graph description of the design. In an example, the DPE array compiler 604 identifies the compute nodes 902-912 and connections between them. The DPE array compiler 604 then forms a graph where the nodes are the kernels and the edges are connections, as shown in FIG. 9A.

At step 1104, the DPE array compiler 604 processes the directed graph to cluster kernels into groups that can execute on a core in a data processing engine. In the example, the kernels are selected from compute nodes B 904, C 906, D 908, and E 910. That is, each DPE 110 can execute one or more kernels and the DPE array compiler 604 determines which of the kernels can be combined for execution as groups. As shown in FIG. 9B, the DPE array compiler 604 can combine node B 904 and node C 906 into a group 905, and the node D 908 and the node E 910 into a group 907.

At step 1106, the DPE array compiler 604 processes the code defining each the kernels for optimization to improve performance and reduce memory footprint of the kernel clusters. At step 1108, the DPE array compiler 604 maps the kernels (or kernel clusters if any) onto the DPEs 110 in the DPE array 105. As shown in FIG. 10, the kernels represented by nodes B 904 and C 906 are mapped to a core 202-1 of one DPE, and the kernels represented by nodes D 908 and E 910 are mapped to a core 202-3 of another DPE.

At step 1110, the DPE array compiler 604 maps data structures defined in the kernel code onto local memory banks in the corresponding DPEs 110 or to DMA for non-local communication. As described above, DPEs in proximity with each other can share memory banks. Communication through shared memory can be single buffered or double buffered as described further herein. However, in some cases, a DPE may be far enough from another DPE such that the kernels executing thereon require DMA communication. As shown in FIG. 9C, communication between nodes A 902 and B 904 is through a double buffer 914; communication between the node B 904 and the node C 906 is through a single buffer 916; communication between the node C 906 and the node D 908 is through a double buffer 918; communication between the node D 908 and the node E 910 is through a single buffer 920; communication between the node E 910 and the node B 904 is through a double buffer 922; and communication between the node D 908 and the node F 912 is through a double buffer 924. As shown in FIG. 10, the buffer 914 is mapped to RAM banks 318 in a memory module 351-1. The buffer 918 is mapped to RAM banks 318 in a memory module 351-2. The buffer 924 is mapped to RAM banks 318 in the memory module 351-4. The memory buffers 916, 920, and 922 are mapped to the RAM banks 318 in the memory module 351-3.

At step 1112, the DPE array compiler 604 allocates communication channels between the DPE array 105 and the PL 122. For example, communication channels to input/output circuitry configured in the PL 122 (e.g., compute nodes a and f). For example, as shown in FIG. 10, node A 902 is configured for DMA communication with DMA 220 in the memory module 351-1. Node F 912 is configured for DMA communication with DMA 220 in the memory module 351-4.

At step 1114, the DPE array compiler 604 allocates locks for core-to-core and core-to-DMA (if necessary) synchronization among the kernels. As shown in FIG. 9D, the DPE array compiler 604 allocates locks 924 between the nodes A 902 and B 904; locks 928 between the nodes C 906 and D 908; locks 926 between the nodes E 910 and B 904; and locks 930 between the nodes D 908 and F 912. The locks 924, 926, 928, and 930 provide for synchronization of the double buffers between nodes.

At step 1116, the DPE array compiler 604 routes the stream data communication between cores and to/from the PL 122 via stream switches (e.g., circuit-switched and/or packet-switched). At step 1118, the DPE array compiler 604 generates wrapper code for each DPE 110 and compiles the wrapper code to generate DPE binaries. At step 1120, the DPE array compiler 604 generates control code to configure the DMAs stream switches. At step 1122, the DPE array compiler 604 generates application programming interfaces (APIs) for the control software executing on the processing system to access and control the kernels executing in the data processing engine array.

Heuristic Partitioner

In the method 1100 described above, the DPE array compiler 604 clusters kernels into groups that can execute on DPEs 110 (step 1104). Computationally, the partitioning problem is non-polynomial (NP) hard, which follows from the reduction of the classic problem of bin packing with conflicts to the partitioning problem. In examples herein, for tractability, greedy heuristics are used in the partitioning algorithm In the graph-based programming model, each kernel has an associated runtime ratio, which denotes an upper bound on its execution time compared to the cycle budget. The sum total of runtime ratio of the kernels clustered together must not exceed one. Additionally, the user can also specify co-location constraints between kernels, or absolute location constraints on a kernel, which influences the allocation of kernels to a partition and the mapping of kernels/partitions to the data processing engines. Compare to prior efforts, the partitioning scheme described herein is unique in that it handles a wide variety of constraints encompassing absolute, relative, and derived constraints. The techniques also dynamically infer some constraints while creating the partitions, so that a feasible partition-to-core mapping can be found. Further, the techniques allow the user to choose among different partitioning heuristics, each with a multi-criteria objective function.

Figure 12:
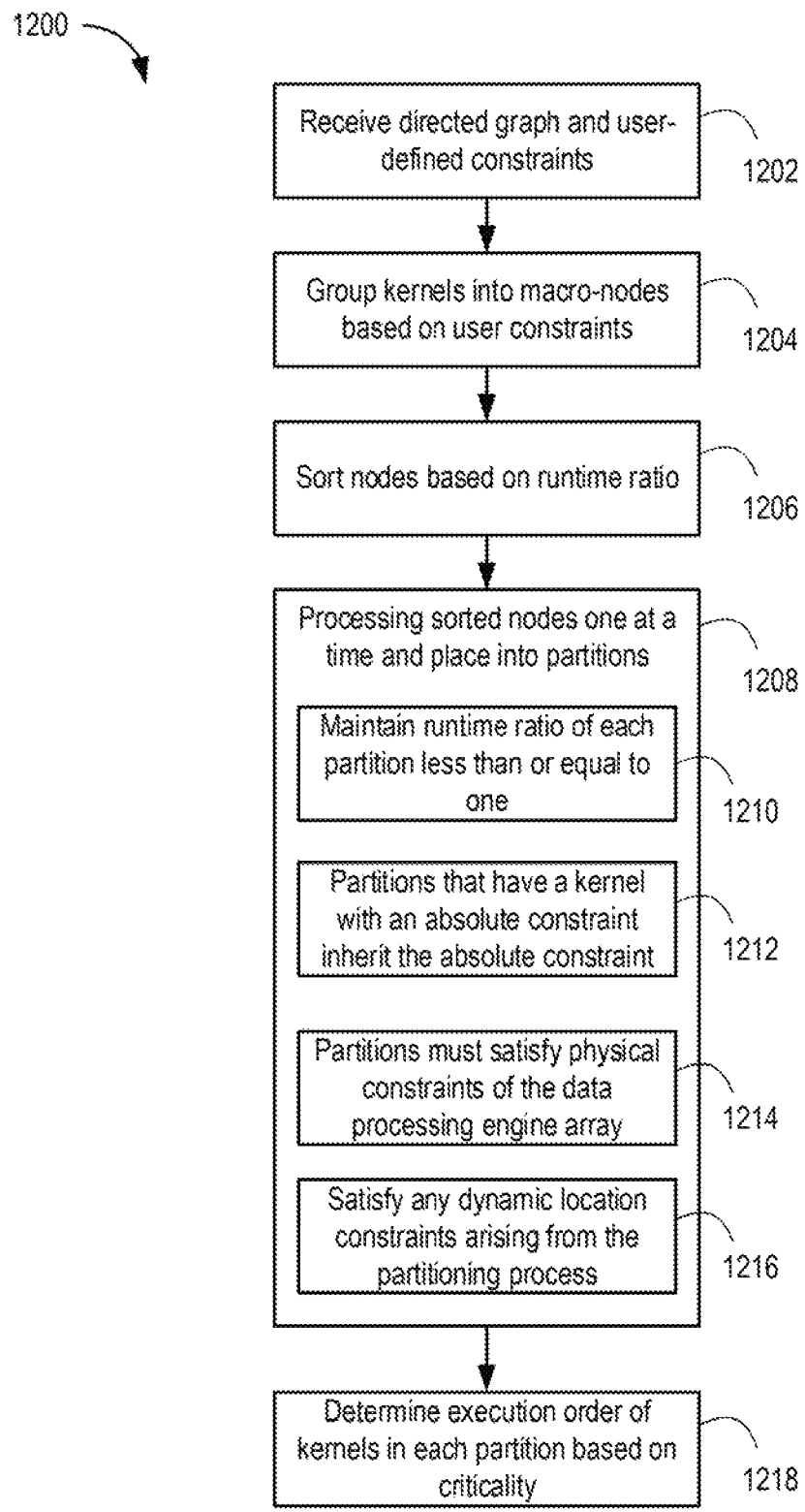
FIG. 12 is a flow diagram depicting a method of partitioning kernels in an application among data processing engines according to an example.

FIG. 12 is a flow diagram depicting a method 1200 of partitioning kernels in an application among DPEs according to an example. The method 1200 can be performed as part of step 1104 described above. The method 1200 begins at step 1202, where the DPE array compiler 604 receives a directed graph (e.g., formed in step 1102 described above). In the directed graph, the nodes are the kernels and the edges represent dataflow between the kernels. The user can define absolute constraints, such as a particular kernel must be placed in a particular data processing engine. The user can also define relative constraints, such as a particular set of kernels must be place in the same data processing engine. At step 1204, the DPE array compiler 604 groups some kernels into a "macro-node" based on user-defined constraints ("user constraints"). The graph now includes nodes and macro-nodes, where a node comprises a single kernel and a macro-node comprises two or more kernels. Henceforth, the description does not distinguish between node and macro-node and uses nodes and kernels interchangeably.

At step 1206, the DPE array compiler 604 sorts the nodes in the graph based on their runtime ratio, and criticality. This is done in two steps. First, the DPE array compiler 604 sorts the nodes based on their static level to create list L1. The static level for a node n is computed as the maximum cumulative runtime ratio from n to any sink in the graph. Then the DPE array compiler 604 scans L1 to find an unexplored node m. With m as the root, it performs a reverse postorder (RPO) traversal, while prioritizing exploration in a depth-first manner. The description terms this traversal depth-prioritized RPO. All the nodes explored in the RPO traversal are appended to a new list L2. Then a new unexplored node is chosen from L1, and step 1206 is repeated until all the nodes in L1 are explored. The RPO traversal exploits locality, increases the probability of placing producer-consumer kernels in the same partition, and increases the probability that the critical path is not worsened.

At step 1208, the DPE array compiler 604 processes the sorted nodes one at a time and places them into final partitions. Each node can be placed in an existing partition or in a new partition. The assignment is performed by determining the constraints between the selected kernel and the existing kernels in each partition. For example, the DPE array compiler 604 maintains the runtime ratio of each partition to be less than or equal to one (e.g., so that a give data processing engine does not become overcommitted) (step 1210). Thus, a kernel k_a cannot be assigned to a partition b_a if the sum of the runtime ratios of the kernels in b_a and the runtime ratio of the kernel k_a exceeds one.

In another example, a partition that has a kernel with an absolute constraint inherits the absolute constraint (step 1212). Thus, if a kernel k_a has an absolute constraint that pins the kernel to a particular data processing engine, and the partitioning algorithm maps k_a to partition b_a, then the absolute constraint of k_a extends to the partition b_a. Afterwards, the DPE array compiler 604 does not add a different kernel k_b to the partition b_a, where k_b has an absolute constraint that maps it to a different data processing engine than k_a.

In another example, the DPE array compiler 604 ensures that the partitions satisfy physical constraints of the data processing engine array (step 1214). For example, a partition cannot have more than a defined number of input/output stream ports for the given architecture. Two kernels in the same partition cannot have particular types of connections between them, such as stream, cascade, or asynchronous connections.

In another example, the DPE array compiler 604 satisfies any dynamic location constraints arising from the partitioning process (step 1216). As the partitioning progresses, some location constraints may dynamically arise between two partitions that have crossing double-buffer data edges. Such partitions may need to be mapped to adjacent data processing engines in the array.

In step 1208, the partitioning algorithm keeps track of all constraints and honors them while assigning kernels to partitions. If a kernel cannot be added to any pre-existing partition due to constraint conflict, then the DPE array compiler 604 creates a new partition. However, if there are multiple partitions to which a kernel can be added, there are two possibilities: (1) the DPE array compiler 604 can add the kernel to one of the pre-existing partitions; or (2) the DPE array compiler 604 can add the kernel to a new partition. The first option minimizes the number of opened partitions, which has direct implications on power consumption. The second option can help to reduce the overall execution latency. Since the user may have different objectives for different applications (e.g., reducing power usage versus reducing execution time), the DPE array compiler 604 can provide two implementations for the user: (1) one that minimizes the number of partitions, i.e., that would add the kernel to one of the conflict-free pre-existing partitions whenever possible; and (2) one that adds the kernel to a conflict-free partition only if it does not worsen the critical path length, otherwise a new partition is created. In both cases, should the algorithm decide that the kernel can be added to multiple partitions, priority is given to the partition that minimizes the number of double buffer edges across partitions.

At step 1218, the design tool determines an execution order of kernels in each partition based on criticality. After partitioning, the kernels in each partition are to be executed sequentially. In order to avoid an increase in execution latency, the kernels in a given partition are executed based on their criticality.

Some constraints of the partitioning problem can also be formulated as an integer linear programming (ILP) problem, which can be solved by using an ILP solver. However, not all of the constraints/objective functions can be effectively represented in ILP and the solution may well be exponential in time. The heuristic-based partitioner described herein is greedy and therefore linear in time. Partitioning is done in tandem with mapping. Alternatively, partitioning and mapping can be done concurrently.

Figure 13:
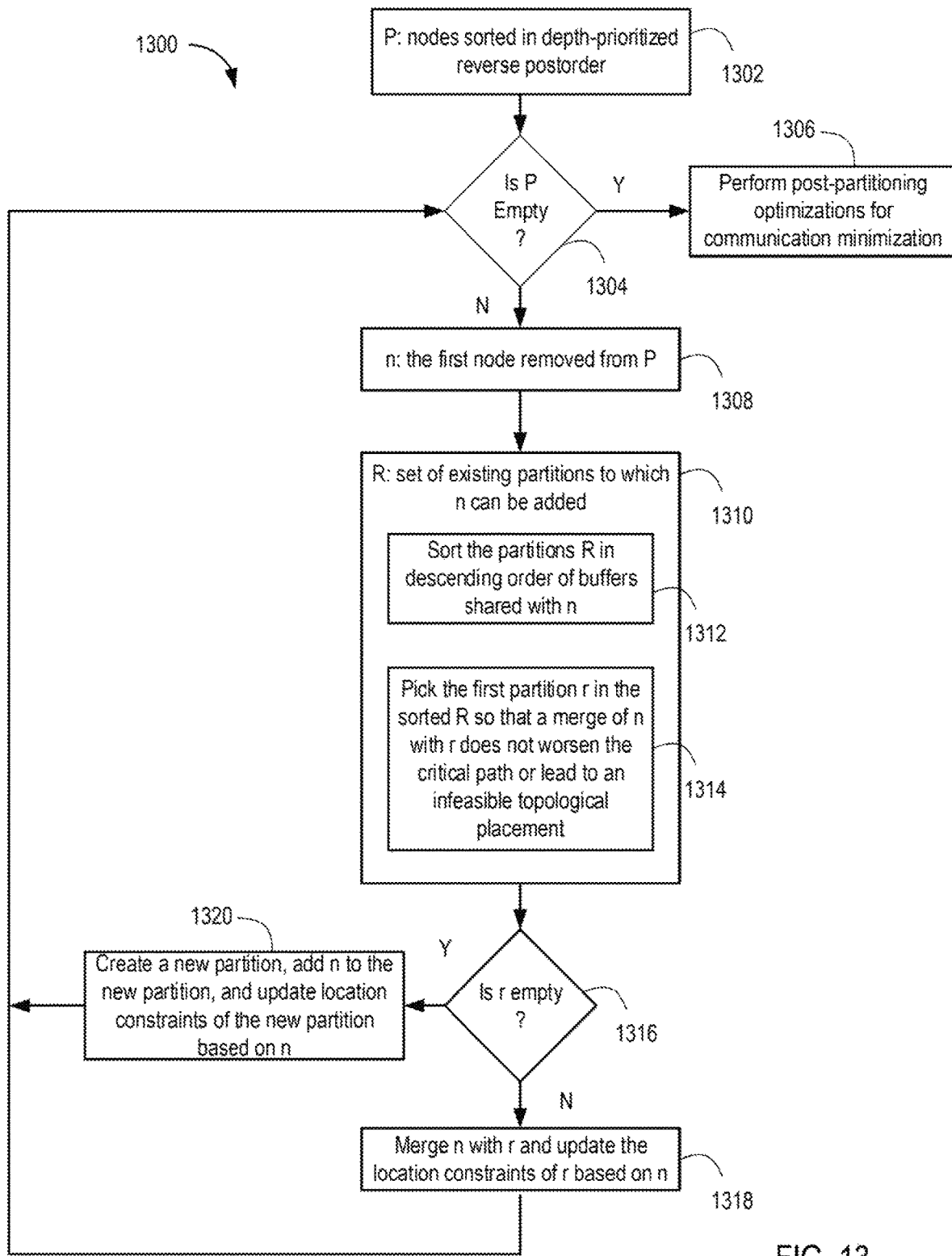
FIG. 13 is a flow diagram depicting a method of assigning kernels to partitions according to an example.

FIG. 13 is a flow diagram depicting a method 1300 of assigning kernels to partitions according to an example. The method 1300 can be performed as part of the step 1208 in the method 1200 described above. The method 1300 begins at step 1302, where the DPE array compiler 604 obtains the set P of nodes sorted in depth-prioritized reverse postorder (e.g., from step 1206). At step 1304, the DPE array compiler 604 determines if the set P is empty (e.g., whether all kernels have been assigned to partitions). If so, the method 1300 proceeds to step 1306 and performs post-partitioning optimizations for communication minimization. Otherwise, the method 1300 proceeds to step 1308. At step 1308, the DPE array compiler 604 removes a node n from the set P. At step 1310, the DPE array compiler 604 assigns the node n to an existing or new partition.

In particular, the DPE array compiler 604 determines a set R of existing partitions to which n can be added. At step 1312, the DPE array compiler 604 sorts the partitions R in descending order of buffers shared with n. As described above, some kernels can share memory buffers with other kernels. At step 1314, the DPE array compiler 604 picks the first partition r in the sorted R so that a merge of n with r does not: (1) worsen the critical path or (2) lead to an infeasible topological placement.

At step 1316, the DPE array compiler 604 determines if r is empty (i.e., there is no existing partition for n). If not, the method 1300 proceeds to step 1318, where the DPE array compiler 604 merges the node n with the partition r and updates the location constraints of the partition r based on the node n (e.g., any absolute and/or relative constraints defined for n). If r is empty, the method 1300 proceeds instead to step 1320, where the DPE array compiler 604 creates a new partition, adds n to the new partition, and updates the location constraints of the new partition based on n. The method 1300 proceeds from either step 1318 or the step 1320 to step 1304 and repeats until all nodes have been processed.

Mapping

As described above in step 1108, the DPE array compiler 604 maps kernels and kernel clusters onto DPEs 110. Input to the mapping algorithm is a static directed graph (e.g., FIG. 9B) and a device description. The mapping algorithm provides as output the physical location in the DPE array 105 where each of the kernels is placed, where the buffers between kernels are placed, and where IO nodes are mapped.

Figure 14:
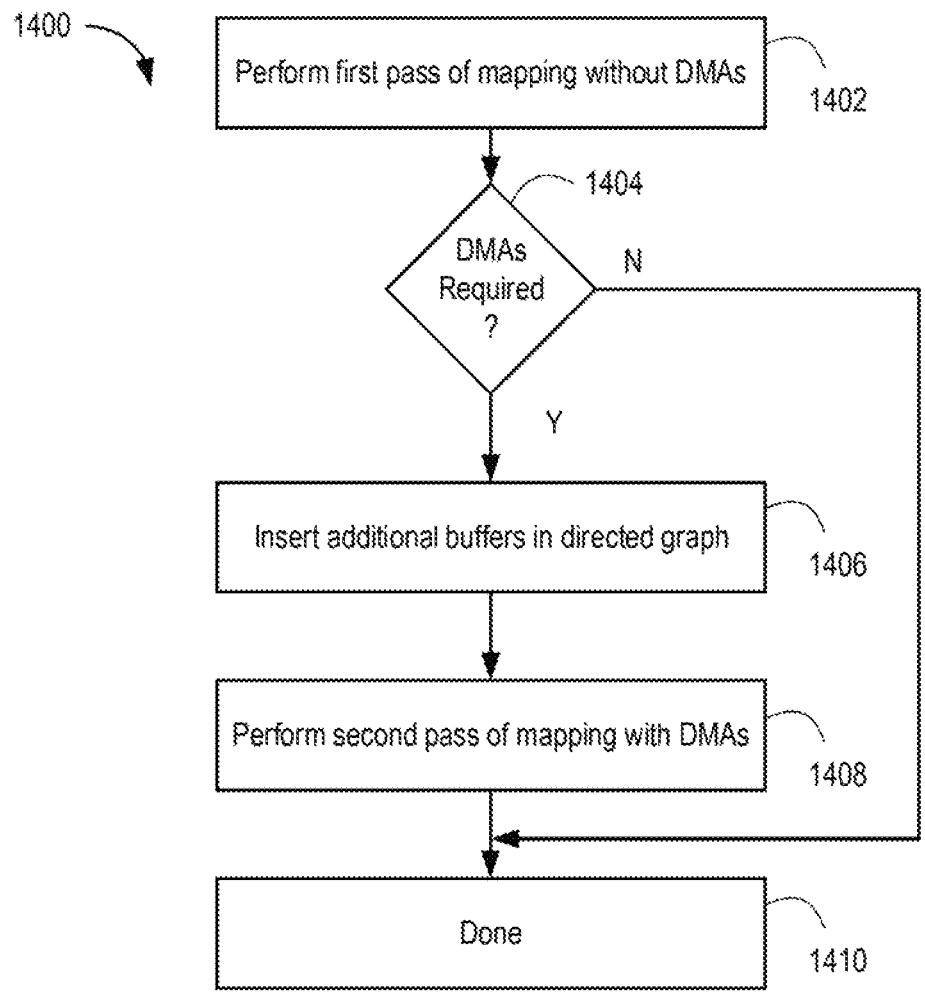
FIG. 14 is a flow diagram depicting a method of mapping kernels and kernel clusters onto DPEs according to an example.

FIG. 14 is a flow diagram depicting a method 1400 of mapping kernels and kernel clusters onto DPEs 110 according to an example. The method 1400 can be performed as part of step 1108 in the method 1100 described above. The method 1400 begins at step 1402, where the DPE array compiler 604 performs a first pass of mapping kernels, buffers, and IO nodes without introducing DMA communication for block-based data movement between kernels (e.g., data movement within the DPE array 105). At step 1404, the DPE array compiler 604 determines if any DMAs are required. If not, the method 1400 proceeds to step 1410 and finishes. Otherwise, the method 1400 proceeds to step 1406.

At step 1406, the DPE array compiler 604 inserts additional buffers in the directed graph to provide for DMA communication between kernels within the DPE array 105. At step 1408, the DPE array compiler 604 performs a second pass of mapping having the DMA communication links. The second pass of mapping can be executed faster than the first pass because the solution from the first mapping pass can be used as a starting point. Thus, the DPE array compiler 604 need only place the newly inserted buffers for DMA communication. The method 1400 then ends at step 1410.

Both mapping passes (1402 and 1408) solve an ILP based optimization problem with heuristic cost objectives. The objectives of the optimization problem are (1) minimize the number of data movements; 2) minimize memory conflicts; and 3) minimize latency.

Data movement optimization: Each core 202 in a DPE 110 can access memory modules 351 on all cardinal sides (North, South, East, and West) as shown in FIG. 3. When mapping a kernel to a core 202, the DPE array compiler 604 ensures the all the buffers that are accessed by the kernel are placed in one of the memory modules 351 that can be directly accessed from the particular core 202. Two kernels mapped to different cores 202 can communicate through memory in two different ways, namely, non-DMA and DMA. For non-DMA, a kernel is writing data to memory, which is then read by another kernel. If the two kernels are mapped to cores 202 that can access the same memory module 351, then no DMA communication between the cores 202 is required. For DMA, two kernels are mapped to cores 202 that cannot access the same memory module 351. In such case, the buffer between the kernels is replicated in two different memory modules 351, one of which can be accessed by the first core 202 and another of which can be access by the second core 202. Data from the first memory module 351 is transferred to the second memory module 351 through the DPE interconnect 209 using DMA. Compared to non-DMA, DMA requires twice the memory footprint, twice the number of locks, and two DMA channels in addition to the routing resources in the DPE interconnect 209.

The DPE array compiler 604 models the DPE array 105 as a checkerboard architecture using a cost model where each core's neighboring memory modules have zero access cost and the remaining memory modules have higher cost. The optimization problem is then to map kernels to cores and buffers to memory modules with minimal cost. The problem is naturally expressible as a quadratic optimization problem. The DPE array compiler 604 works to reduce the quadratic problem to an ILP problem.

Memory conflict optimization: Each memory module 351 includes RAM banks 318 (e.g., eight banks of RAM). When there are multiple accesses to the same RAM bank in the same cycle, there is a memory access conflict. Memory access conflicts can be classified into different types: (1) Intra-core memory access conflict; (2) inter-core memory access conflict; (3) core-DMA memory access conflict; and (4) DMA-DMA memory access conflict. For intra-core memory access conflict, the cores execute very large instruction word (VLIW) instructions. Each VLIW instruction can have multiple memory access instructions (e.g., up to two loads and one store). If two or more memory operations in a single instruction access the same memory bank, it will cause a memory stall and in turn a core stall. Two or more different cores accessing the same memory bank in the same cycle cause inter-core memory access conflict. A core and DMA channel access the same memory bank in the same cycle cause a core-DMA memory access conflict. Multiple DMA channels accessing the same memory bank in the same cycle cause a DMA-DMA memory access conflict.

Since completely avoiding conflicts may not be possible for all applications, the DPE array compiler 604 allows the user to choose from a set of conflict avoidance and conflict minimization settings. The DPE array compiler 604 makes the distinction between local buffers (e.g., buffers that are accessed by a single kernel) and shared buffers (e.g., buffers that are accessed by multiple kernels) and performs different optimizations. The DPE array compiler 604 takes a two-pronged approach to address memory conflicts: 1) conflict avoidance; and 2) conflict minimization. For conflict avoidance, to avoid access conflicts between the producer and consumer of a data block, the DPE array compiler 604 ensures that double buffers (e.g., ping buffer and pong buffer) are mapped to different RAM banks. Similarly, the DPE array compiler 604 ensures that there are no conflicts between accesses of local buffers from different kernels by placing them on different banks. Intra-core memory conflicts are avoided by placing all buffers accessed by a single kernel on different RAM banks 318.

For conflict minimization, the problem is reduced to the problem of minimizing the number of independent actors (cores, DMA channels) that are accessing a given memory bank. Modeling this as an ILP problem can be expensive for large devices, sine the number of cores and DMA channels are proportional to c times r, where c is the number of columns and r is the number of rows in the DPE array 105 of the device. The DPE array compiler 604 employs a technique to reduce the number of ILP variables by modeling all DMA channels as two distinct actors (a reader and a writer) instead of c×r×4 different entities.

Latency minimization: Similar to FPGA placement algorithms, the DPE array compiler 604 minimizes the latency of stream-based communication by minimizing the distance between the source and sink.

Stream FIFO Insertion in a Heterogeneous Multi-Core Architecture

FIFO determination and insertion for deadlock-avoidance and performance has been researched in the past, but largely in the context of theoretical models of computation (e.g., synchronous data flow, Kahn Process networks) and high-level synthesis. This problem has not been solved for multi-processor systems, largely because there are few such systems that communicate with each other using elastic, handshake streams (e.g., most multi-processor systems use shared memory for data communication or are systolic arrays that work in lock-step).

Figure 15:
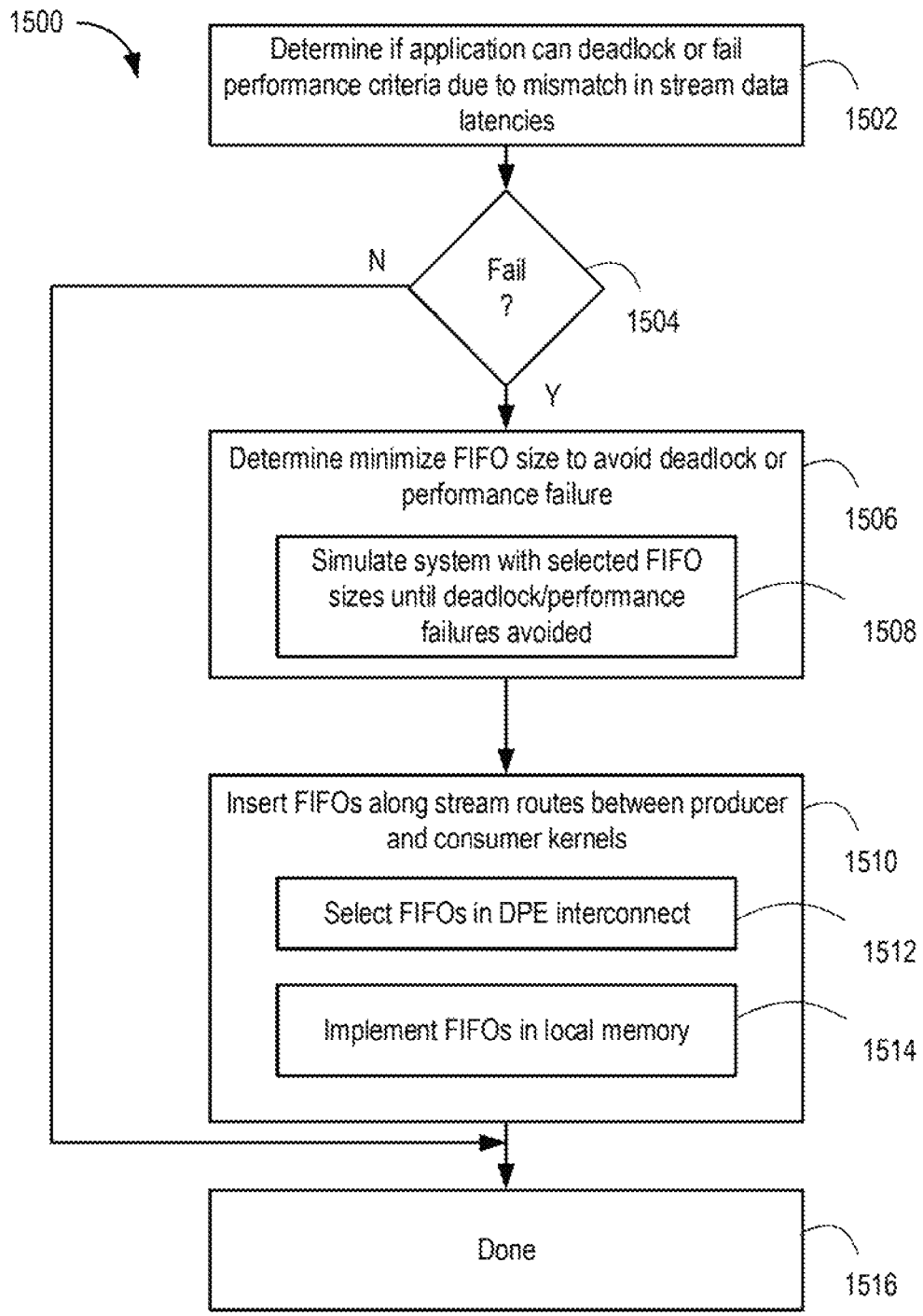
FIG. 15 is a flow diagram depicting a method of FIFO insertion when implementing an application for a heterogeneous multi-core architecture.

FIG. 15 is a flow diagram depicting a method 1500 of FIFO insertion when implementing an application for a heterogeneous multi-core architecture. The method 1500 can be performed during any of steps 1108, 1110, 1112, 1114, and 1116 in the method 1100 described above. The method 1500 begins at step 1502, where the DPE array compiler 604 determines if the application can deadlock or fail performance criteria due to mismatch in stream data latencies along reconvergent computation and communication paths. If a failure occurs (step 1504), the method 1500 proceeds to step 1506. Otherwise, the method 1500 ends at step 1516. At step 1506, the DPE array compiler 604 determines minimum FIFO sizes to avoid any deadlocks and/or performance failures identified in the computation and communication paths. In an example, one or more of the minimum FIFO sizes can be predefined (e.g., specified by a user).

A theoretical analysis of this for the general case is difficult and conservative, which can lead to very large FIFOs. Thus, in an example, the DPE array compiler 604 implements a simulation-based approach. The DPE array compiler 604 simulates the system with selected FIFO sizes until deadlock/performance failures are avoided (step 1508). The simulation can be at different levels of abstraction: compute-kernel code may be untimed, but kernels run concurrently ("untimed and concurrent execution of the kernels); or kernels may be modeled in a cycle-accurate manner ("cycle-accurate concurrent execution of the kernels).

Once the FIFO sizes are determined at step 1506, the FIFOs need to be inserted along the stream routes between the producer and consumer compute-kernels (step 1510). In the DPE array 105, there are two options: each stream switch has two FIFOs of limited size (e.g., 16 words each); or local data memory can be used as FIFOs via the tile-DMA engine. The latter option is needed if the FIFO sizes are very large. With the former option, one complication is that the number of stream switches along a producer-to-consumer route limits the total number of limited-size FIFOs that can be used. So the route itself may need to be artificially lengthened in order to meet the total specified or determined FIFO size. Another complication is that multiple routes may share a stream switch. Therefore, the heuristic to distribute the specified or determined FIFO length along the routes' stream switches accounts for such sharing. Thus at step 1512, the DPE array compiler 604 can select FIFOs in the DPE interconnect. In addition or alternatively, at step 1514, the DPE array compiler 604 can implement FIFOs in local memory. The method 1500 then ends at step 1516.

Figure 16:
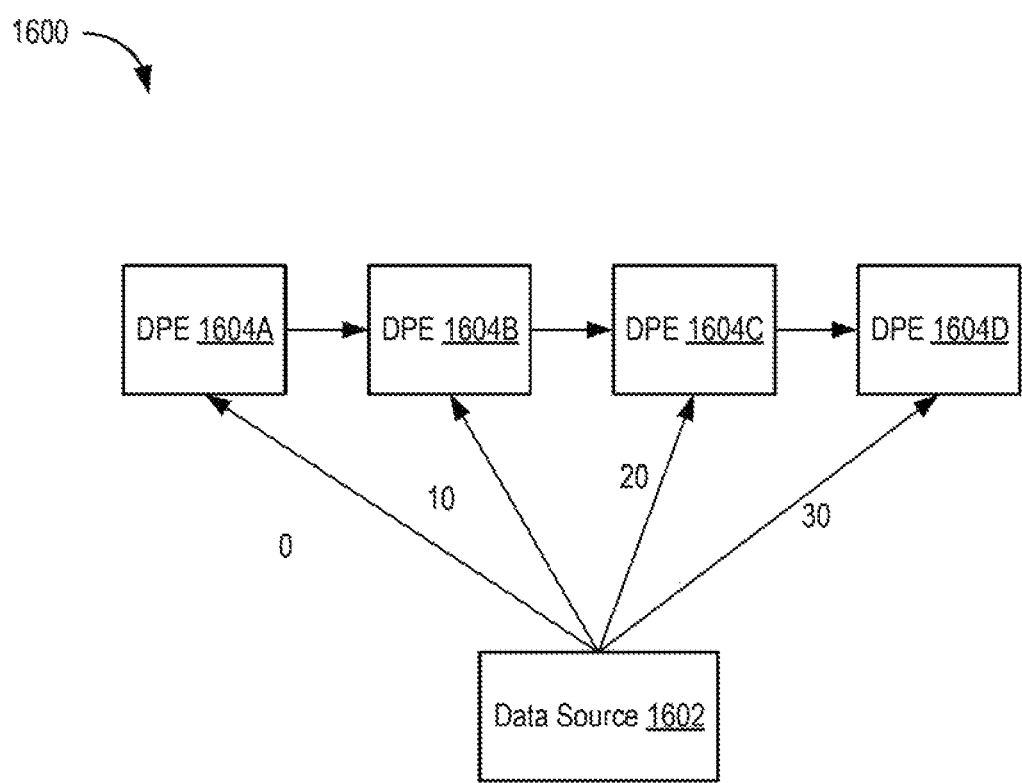
FIG. 16 is a block diagram depicting a processing system according to an example.

FIG. 16 is a block diagram depicting a processing system 1600 according to an example. The processing system 1600 can be the result of step 1506 described above. In the example, the processing system 1600 includes a data source 1602 and a plurality of DPEs 1604A-1604D). The data source 1602 provides data to be processed by each DPE 1604. The DPEs 1604 are coupled in series (e.g., a pipeline formed by DPE 1604A, DPE 1604B, DPE 1604C, and DPE 1604D in that order). In step 1506, the DPE array compiler 604 can determine that the path between the data source 1602 and the DPE 1604A does not need a FIFO; the path between the data source 1602 and the DPE 1604B needs a FIFO of depth 10; the path between the data source 1602 and the DPE 1604C needs a FIFO of depth 20; and the path between the data source 1602 and the DPE 1604D needs a FIFO of depth 30.

Figure 17A:
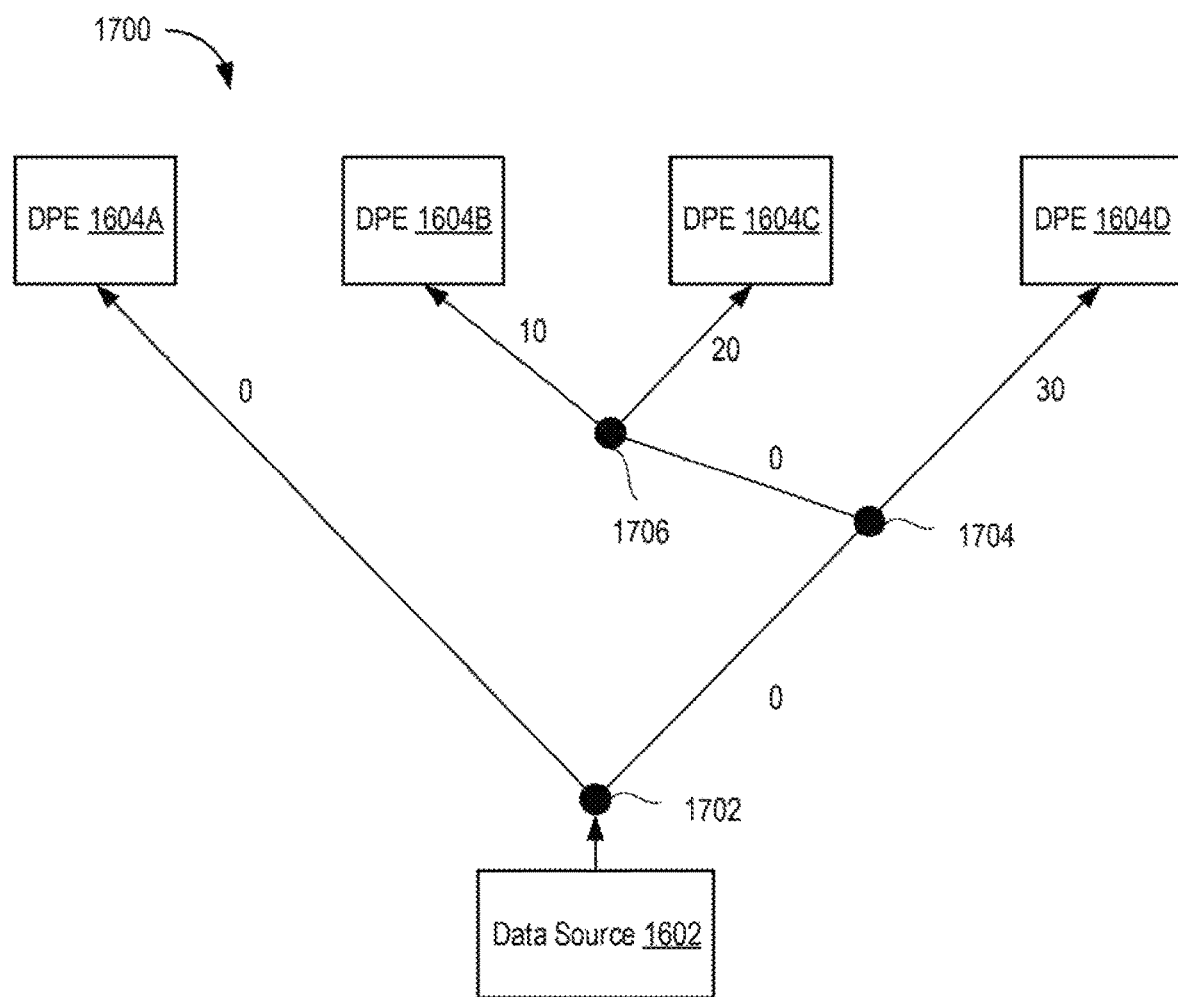
FIG. 17A is a block diagram depicting an implementation of the processing system of FIG. 16 according to an example.

FIG. 17A is a block diagram depicting an implementation 1700 of the processing system 1600 according to an example. In the example, the implementation 1700 includes nodes 1702, 1704, and 1706, each of which represents a switch in the DPE interconnect 209. The implementation 1700 is a worst-case implementation of the processing system 1600, since it requires the most FIFO resources (e.g., FIFOs of depth 10, 20, and 30 for a total depth of 60). Thus, at step 1510, the DPE array compiler 604 can perform more efficient placement of FIFOs as described in the algorithm below.

Figure 17B:
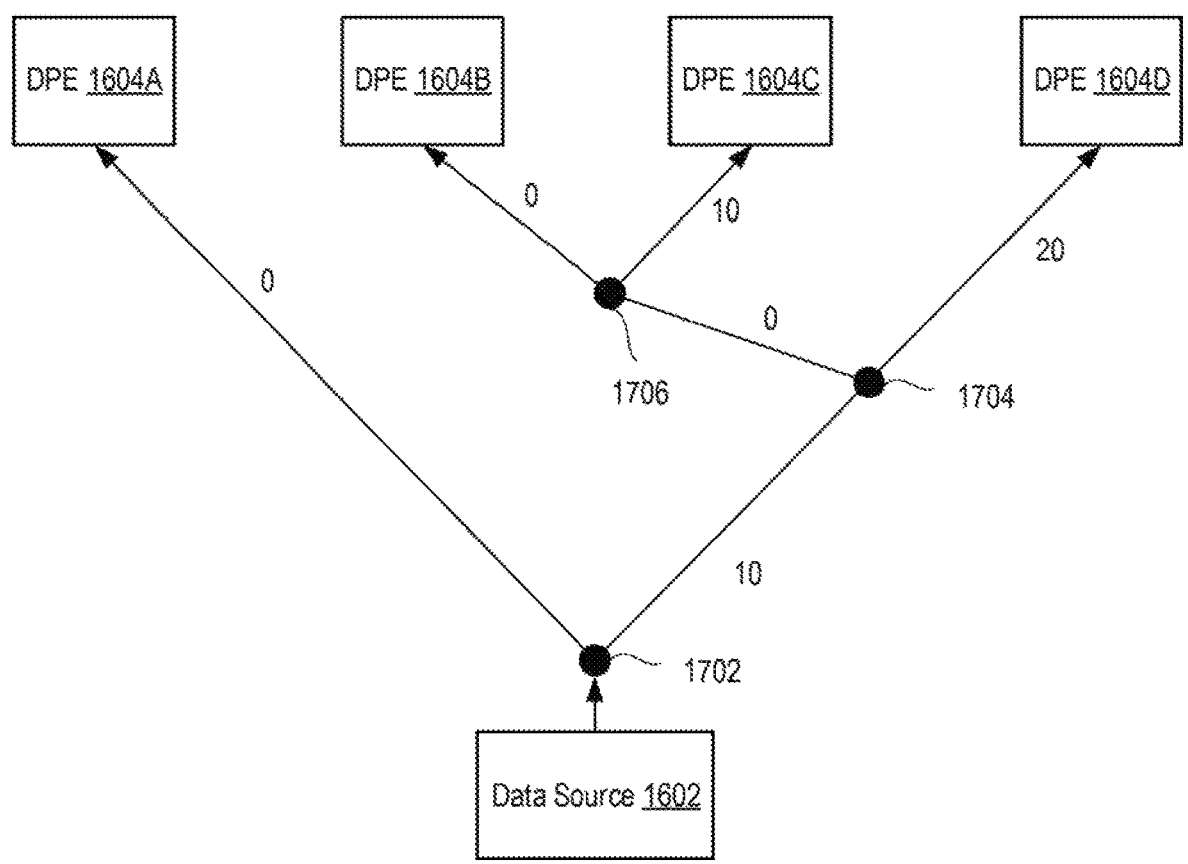
FIG. 17B is a block diagram depicting an implementation of the processing system of FIG. 16 according to another example.

FIG. 17B is a block diagram depicting an implementation 1701 of the processing system 1600 according to another example. In the example of FIG. 17B, the implementation 1701 includes FIFOs of depth 10, 10, and 20 for a total depth of 40. The implementation 1701 achieves the required FIFOs of the processing system 1600 using less resources than the implementation 1700.

Figure 18:
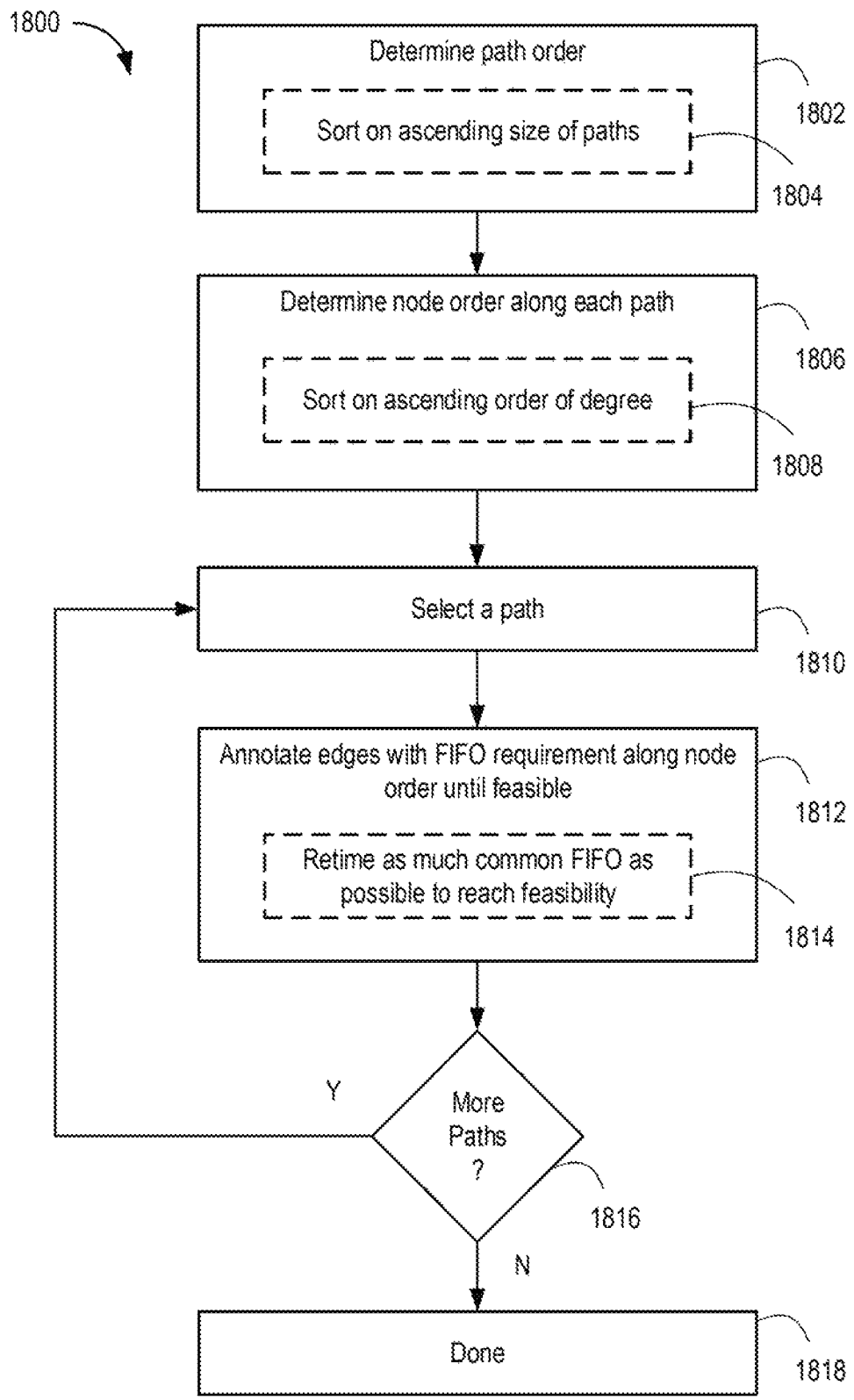
FIG. 18 is a flow diagram depicting a method of placing FIFOs according to an example.

FIG. 18 is a flow diagram depicting a method 1800 of placing FIFOs according to an example. The method 1800 can be performed by the DPE array compiler 604 in the step 1510 of the method 1500. The method 1800 begins at step 1802, where the DPE array compiler 604 determines a path order. A path is the collection of one or more nodes between the data source 1602 and a DPE 1604. In an example, the DPE array compiler 604 processes the paths in an arbitrary order (e.g., from left to right). Another example is discussed further below. At step 1804, the DPE array compiler 604 determines a node order along each path. In an example, the DPE array compiler 604 determines the node order to be from the DPEs 1604 towards the data source 1602. Another example is discussed further below.

At step 1810, the DPE array compiler 604 selects a path to process. At step 1812, the DPE array compiler 604 annotates the edges with a FIFO requirement along the node order until a feasible FIFO placement is reached. In some cases, the DPE array compiler 604 "retimes" as much common FIFO as possible to reach feasibility while still satisfying the FIFO requirement (step 1814). For example, consider the path between the data source 1602 and the DPE 1604C. When processing this path, the DPE array compiler 604 may assign a FIFO of depth 10 between the nodes 1704 and 1706, and a FIFO of depth 10 between the node 1706 and the DPE 1604C. This would satisfy the FIFO requirements of both the DPEs 1604B and 1604C. However, when processing the path between the data source 1602 and the DPE 1604D, the DPE array compiler 604 may retime the FIFO between the data source 1602 and the node 1704 from a depth of 0 to a depth of 10, and retime the FIFO between the nodes 1704 and 1706 from a depth of 10 to a depth of 0. The result is shown in FIG. 17B. The DPE array compiler 604 determines a FIFO of depth 20 between the node 1704 and the DPE 1704D to satisfy the FIFO requirements.

In an example, at step 1802, the DPE array compiler 604 performs a whole graph analysis to determine an order for the paths to be processed. Instead of looking at one path at a time to assign a FIFO, the DPE array compiler 604 can look at all paths that require FIFO insertion. The DPE array compiler 604 can then sort the paths in ascending order of size of the paths (step 1804) in terms of the number of nodes along the paths. If paths have equal numbers of nodes, the DPE array compiler 604 can sort based on the FIFO depth of the path in order of smallest depth to largest depth.

In an example, at step 1806, the DPE array compiler 604 reorders the nodes along each path identified in step 1804. A degree of a node is defined as a total number of times a node is used across all of the paths. The DPE array compiler 604 can sort the nodes in ascending order of degree. By performing whole graph analysis and node ordering ahead of FIFO determination, the method 1800 can move the common FIFO depth towards the data source while being able to update the depths near the DPEs. Further, the method 1800 can handle broadcast from the FIFO ports.

In the example of FIG. 17A, the shortest path requiring a FIFO is between the data source 1602 and the DPE 1604D. The paths between the data source 1602 and the DPEs 1604B and 1604C are of the same length (e.g., three nodes). However, the path between the data source 1602 and the DPE 1604B has a shallower FIFO depth (e.g., 10) versus the path between the data source 1602 and the DPE 1604C (e.g., 20). So the DPE array compiler 604 can process the path between the data source 1602 and the DPE 1604D, followed by the path between the data source 1602 and the DPE 1604B first, and finally the path between the data source 1602 and the DPE 1604C.

In the example of FIG. 17A, the node 1702 is part of three paths, the node 1704 is part of three paths, and the node 1706 is part of two paths. So for the paths between the data source and the DPEs 1604B and 1604C, the node order is 1706, 1704, and 1702. For the path between the data source 1602 and the DPE 1604D, the node order is 1704 and 1702.

The DPE array compiler 604 then performs steps 1810 through 1816 by processing the paths in the determined order, and in the determined node order for each path. The result is shown in FIG. 17B, which is the same as the result from the prior example (without path sorting and node reordering) in this example. However, in a practical example, the solutions obtained can be different.

Routing of Connections Among Cores in a DPE Array

Routing between cores in the DPE array can be achieved by greedily allocating channels to routes that require communication with the PL 122. Being a greedy heuristic, this approach exposes the limitations when routing larger graphs or when requiring handling special constraints. The prior approach does not support handling architectural constraints, packet switching, and handling channels that require upsize/downsize conversion and routing for explicit packet switching in the programming model. Techniques are described herein for routing that handles these requirements.

The following terminology is introduced for use in describing the routing techniques described herein for routing an application mapped to the DPE array 105. Routing node: A node in a routing graph that represents a source or destination of data or an intermediate switch. Node capacity: An integer representing the maximum allowed flow of data through a node. Routing edge: A routing edge represents a potential flow of data from a source to the destination. Routing graph: A routing graph represents all possible routing choices. These choices model the architecture switching constraints, routing constraints imposed by the user defined shim constraints, constraints for upsizing/downsizing channels, and programmer defined constraints through explicit packet split and merge operations. Net: A net represents a desired routing with a source node in the routing graph and multiple destinations in the routing graph. Net utilization: An integer that models bandwidth required by a net. Nets of low bandwidth can be routed together by sharing switching resources.

Figure 19:
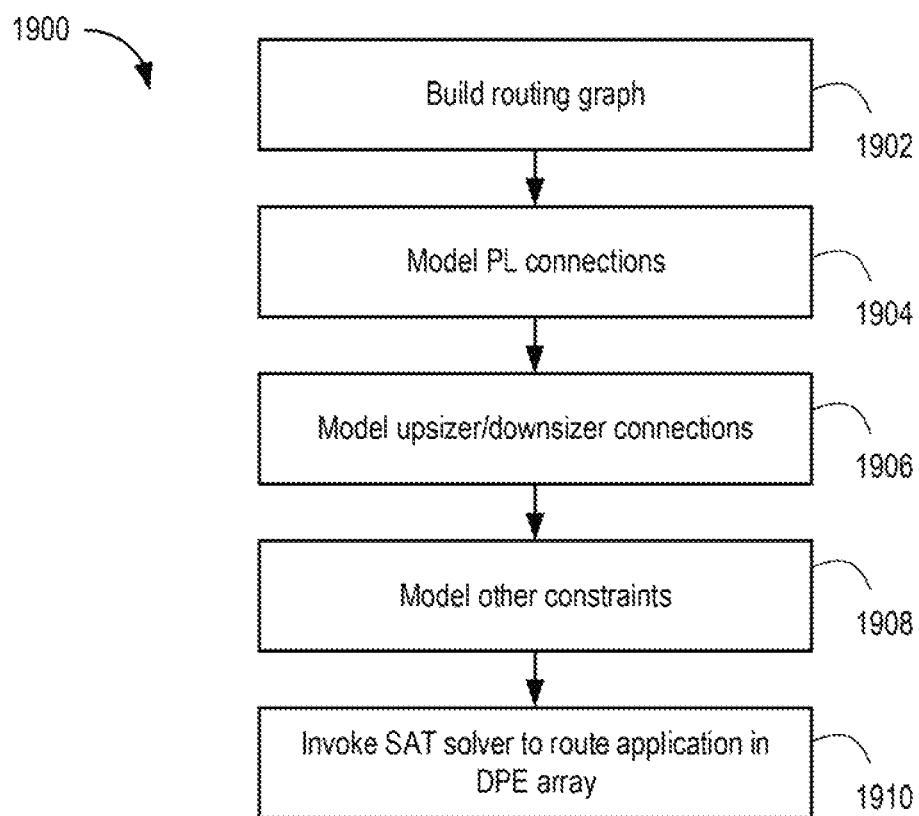
FIG. 19 is a flow diagram depicting a method of routing an application mapped to a DPE array according to an example.

FIG. 19 is a flow diagram depicting a method 1900 of routing an application mapped to a DPE array 105 according to an example. The method 1900 can be performed during step 1116 of the method 1100 described above. The method 1900 begins at step 1902, where the DPE array compiler 604 builds a routing graph. The DPE array compiler 604 builds a routing graph based on a description of the DPE array 105 architecture. Each stream switch port is modeled as a single routing node. Each DMA, control port, and core stream port is modeled as a routing node. The potential choice for switching is expressed as an edge between the nodes. All possible switching options allowed in the architecture are modeled in the routing graph. Building the routing graph only requires a description of the architecture of the DPE array 105.

At step 1904, the DPE array compiler 604 models PL connections. Since the output of a PL node can be connected to any of the shim ports, the DPE array compiler 604 models each PL connection as a cross-bar connection from the PL source to all the channels in the shim. If the user specifies specific constraints on the shim channels, the cross-bar connections can be specialized to the set of given shim constraints.

At step 1906, the DPE array compiler 604 models upsizer/downsizer connections. The shim architecture allows higher bit-width channels running at lower frequency to be connected lower bit-width channels running at higher frequency. The shim channels have a fixed bit-width so implementing some higher bit-width channels requires use of multiple adjacent shim channels. The architecture further puts a restriction that the group of shim channels must be allocated on an even boundary. These constraints are incorporated by modifying the routing graph with new nodes and edges. The constraint is expressed by replacing cross-bar connections to all shim channels with limited connectivity.

At step 1908, the DPE array compiler 604 models other constraints. Some constraints are not easily expressible as connections in the routing graph. These are expressed as additional global constraints on the nets and resource routes. For example, an architecture constraint may be allowing four packet switch nets passing through every switch port. Another example is to allow only one net to pass through a shim channel even though the bandwidth utilization is low. Merging of explicit packet switched nodes early or late are handled using the constraint mechanism.

At step 1910, the DPE array compiler 604 invokes a satisfiability solver (SAT solver) to route the application in the DPE array 105. The input specification graph is examined for nets that require routing. The source and destination of the net are identified. The source or destination net must be nodes in the routing graph. For enabling packet switching, net utilization is provided by the user. All the nets in the input specification are passed together to the SAT solver along with the constraints. The solution provided by the SAT solver is used to program the stream switches of the DPE array 105 (e.g., the stream switch configuration code 616).

Figure 20:
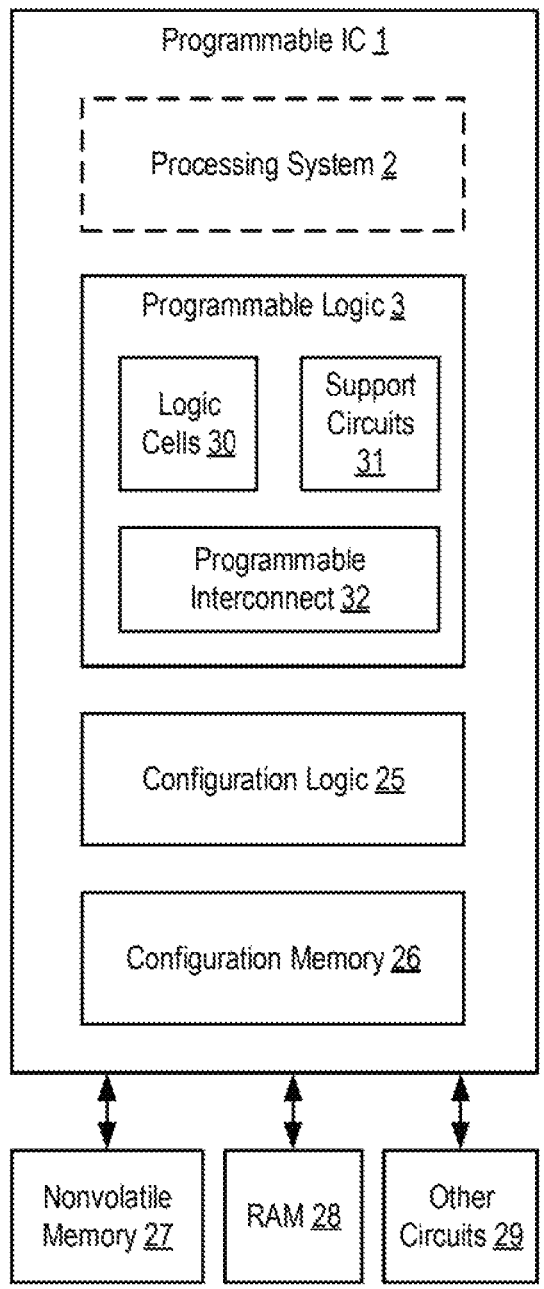
FIG. 20 is a block diagram depicting a programmable IC according to an example that can be used as an implementation of the SoC shown in FIG. 1.

FIG. 20 is a block diagram depicting a programmable IC 1 according to an example that can be used as an implementation of the device 100 shown in FIG. 1. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like.

The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

FIG. 21 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 21. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 12) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 21 include additional logic blocks that disrupt the regular columnar structure making up a large part of the FPGA. The additional logic blocks can be programmable blocks and/or dedicated logic.

Note that FIG. 21 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 21 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method of implementing an application for a system-on-chip (SOC) having a data processing engine (DPE) array, comprising:
    determining a graph representation of the application, the graph representation including nodes representing kernels of the application and edges representing communication between the kernels;
    mapping, based on the graph representation, the kernels onto DPEs of the DPE array and data structures of the kernels onto memory in the DPE array;
    routing communication channels between DPEs and circuitry of the application configured in programmable logic of the SOC; and
    generating implementation data for programming the SOC to implement the application based on results of the mapping and the routing.

2. The method of claim 1, further comprising:
    processing the graph representation to cluster the kernels into groups prior to the step of mapping;
    wherein the step of mapping includes mapping at least one cluster of kernels onto one DPE in the DPE array.

3. The method of claim 1, further comprising:
    optimizing code of one or more of the kernels prior to the step of mapping.

4. The method of claim 1, wherein the step of mapping comprises:
    mapping the data structures onto at least one of memory banks in the DPEs and direct memory access (DMA) streams between DPEs.

5. The method of claim 1, further comprising:
    allocating locks for DPE-to-DPE communication in the DPE array.

6. The method of claim 1, wherein the step of generating the implementation data comprises:
    generating code for each DPE to implement one or more of the kernels therein.

7. The method of claim 1, wherein the step of generating the implementation data comprises:
    generating control code to configure direct memory access (DMA) and switch circuitry in the DPE array.

8. A non-transitory computer readable medium having stored thereon instructions that when executed by a processor cause the processor to perform a method of implementing an application for a system-on-chip (SOC) having a data processing engine (DPE) array, the method comprising:
    determining a graph representation of the application, the graph representation including nodes representing kernels of the application and edges representing communication between the kernels;
    mapping, based on the graph representation, the kernels onto DPEs of the DPE array and data structures of the kernels onto memory in the DPE array;
    routing communication channels between DPEs and circuitry of the application configured in programmable logic of the SOC; and
    generating implementation data for programming the SOC to implement the application based on results of the mapping and the routing.

9. The non-transitory computer readable medium of claim 8, further comprising:
    processing the graph representation to cluster the kernels into groups prior to the step of mapping;
    wherein the step of mapping includes mapping at least one cluster of kernels onto one DPE in the DPE array.

10. The non-transitory computer readable medium of claim 8, further comprising:
    optimizing code of one or more of the kernels prior to the step of mapping.

11. The non-transitory computer readable medium of claim 8, wherein the step of mapping comprises:
    mapping the data structures onto at least one of memory banks in the DPEs and direct memory access (DMA) streams between DPEs.

12. The non-transitory computer readable medium of claim 8, further comprising:
    allocating locks for DPE-to-DPE communication in the DPE array.

13. The non-transitory computer readable medium of claim 8, wherein the step of generating the implementation data comprises:
    generating code for each DPE to implement one or more of the kernels therein.

14. The non-transitory computer readable medium of claim 8, wherein the step of generating the implementation data comprises:
    generating control code to configure direct memory access (DMA) and switch circuitry in the DPE array.

15. A computer system, comprising:
    a memory configured to store program code; and
    a processor configured to execute the program code to implement an application for a system-on-chip (SOC) having a data processing engine (DPE) array by:
        determining a graph representation of the application, the graph representation including nodes representing kernels of the application and edges representing communication between the kernels;
        mapping, based on the graph representation, the kernels onto DPEs of the DPE array and data structures of the kernels onto memory in the DPE array;
        routing communication channels between DPEs and circuitry of the application configured in programmable logic of the SOC; and
        generating implementation data for programming the SOC to implement the application based on results of the mapping and the routing.

16. The computer system of claim 15, further comprising:
processing the graph representation to cluster the kernels into groups prior to the step of mapping;
wherein the step of mapping includes mapping at least one cluster of kernels onto one DPE in the DPE array.

17. The computer system of claim 15, further comprising:
optimizing code of one or more of the kernels prior to the step of mapping.

18. The computer system of claim 15, wherein the step of mapping comprises:
mapping the data structures onto at least one of memory banks in the DPEs and direct memory access (DMA) streams between DPEs.

19. The computer system of claim 15, wherein the step of generating the implementation data comprises:
generating code for each DPE to implement one or more of the kernels therein.

20. The computer system of claim 15, wherein the step of generating the implementation data comprises:
generating control code to configure direct memory access (DMA) and switch circuitry in the DPE array.

\* \* \* \* \*